(12) United States Patent
Gross et al.

(10) Patent No.: US 11,505,492 B2
(45) Date of Patent: Nov. 22, 2022

(54) GLASS COMPOSITIONS AND METHODS WITH STEAM TREATMENT HAZE RESISTANCE

(71) Applicant: CORNING INCORPORATED, Corning, NY (US)

(72) Inventors: Timothy Michael Gross, Painted Post, NY (US); Jingshi Wu, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 17/734,175

(22) Filed: May 2, 2022

(65) Prior Publication Data

US 2022/0259093 A1    Aug. 18, 2022

Related U.S. Application Data

(63) Continuation of application No. 17/611,222, filed as application No. PCT/US2020/032422 on May 12, 2020, now Pat. No. 11,370,696.

(60) Provisional application No. 62/848,777, filed on May 16, 2019.

(51) Int. Cl.
| | | |
|---|---|---|
| *B32B 15/04* | (2006.01) | |
| *B32B 17/06* | (2006.01) | |
| *C03C 3/097* | (2006.01) | |
| *C03C 4/18* | (2006.01) | |
| *C03C 21/00* | (2006.01) | |

(52) U.S. Cl.
CPC ............... *C03C 3/097* (2013.01); *C03C 4/18* (2013.01); *C03C 21/007* (2013.01); *C03C 2204/00* (2013.01)

(58) Field of Classification Search
CPC ........................................................ C03C 3/097
USPC ........................................................ 428/410
See application file for complete search history.

(56) References Cited

U.S. PATENT DOCUMENTS

| | | |
|---|---|---|
| 2,273,778 A | 2/1942 | Berthold |
| 2,377,062 A | 5/1945 | Frederick et al. |
| 3,275,470 A | 9/1966 | Charles |

(Continued)

FOREIGN PATENT DOCUMENTS

| | | |
|---|---|---|
| BE | 382736 A | 9/1931 |
| CN | 101801869 A | 8/2010 |

(Continued)

OTHER PUBLICATIONS

PCT ISR/WO for Int'l App. No. PCT/US2020/032422 dated Jul. 16, 2020 from the European Patent Office.

(Continued)

*Primary Examiner* — Lauren R Colgan
(74) *Attorney, Agent, or Firm* — Russell S. Magaziner

(57) ABSTRACT

Glass-based articles that include a compressive stress layer extending from a surface of the glass-based article to a depth of compression are formed by exposing glass-based substrates to water vapor containing environments. The glass-based substrates have compositions selected to avoid the formation of haze during the treatment process. The methods of forming the glass-based articles may include elevated pressures and/or multiple exposures to water vapor containing environments selected to avoid the formation of haze during the treatment process.

9 Claims, 3 Drawing Sheets

(56) References Cited

U.S. PATENT DOCUMENTS

| | | |
|---|---|---|
| 3,395,998 A | 8/1968 | Olcott |
| 3,485,647 A | 12/1969 | Harrington |
| 3,498,802 A | 3/1970 | Bickford et al. |
| 3,498,803 A | 3/1970 | Stookey |
| 3,653,864 A | 4/1972 | Rothermel et al. |
| 3,756,798 A | 9/1973 | Ernsberger |
| 3,811,853 A | 5/1974 | Bartholomew et al. |
| 3,843,344 A | 10/1974 | Galey |
| 3,912,481 A | 10/1975 | Bartholomew et al. |
| 3,915,720 A | 10/1975 | Tarcza |
| 3,948,629 A | 4/1976 | Bartholomew et al. |
| 4,042,405 A | 8/1977 | Krohn et al. |
| 4,053,679 A | 10/1977 | Rinehart |
| 4,098,596 A | 7/1978 | Wu |
| 4,099,978 A | 7/1978 | Bartholomew et al. |
| 4,102,693 A | 7/1978 | Owen et al. |
| 4,133,665 A | 1/1979 | Bartholomew et al. |
| 4,175,942 A | 11/1979 | Lipp |
| 4,201,561 A | 5/1980 | Pierson et al. |
| 4,214,886 A | 7/1980 | Shay et al. |
| 5,475,528 A | 12/1995 | LaBorde |
| 5,698,019 A | 12/1997 | Frank et al. |
| 6,200,137 B1 | 3/2001 | Hoeland et al. |
| 6,376,402 B1 | 4/2002 | Pannhorst et al. |
| 7,534,734 B2 | 5/2009 | Ellison |
| 7,666,511 B2 | 2/2010 | Ellison et al. |
| 7,833,919 B2 | 11/2010 | Danielson et al. |
| 7,846,857 B2 | 12/2010 | Hoeland et al. |
| 7,851,394 B2 | 12/2010 | Ellison |
| 7,891,212 B2 | 2/2011 | Isono |
| 7,937,967 B2 | 5/2011 | Minazawa |
| 8,075,999 B2 | 12/2011 | Barefoot et al. |
| 8,158,543 B2 | 4/2012 | Dejneka et al. |
| 8,187,987 B2 | 5/2012 | Amin et al. |
| 8,232,218 B2 | 7/2012 | Dejneka et al. |
| 8,586,492 B2 | 11/2013 | Barefoot et al. |
| 8,598,056 B2 | 12/2013 | Ellison et al. |
| 8,759,238 B2 | 6/2014 | Chapman et al. |
| 8,802,581 B2 | 8/2014 | Dejneka et al. |
| 8,854,623 B2 | 10/2014 | Fontaine et al. |
| 8,969,226 B2 | 3/2015 | Dejneka et al. |
| 9,156,724 B2 | 10/2015 | Gross |
| 9,162,919 B2 | 10/2015 | Ellison et al. |
| 9,321,677 B2 | 4/2016 | Chang et al. |
| 9,346,703 B2 | 5/2016 | Bookbinder et al. |
| 9,527,767 B2 | 12/2016 | Ellison et al. |
| 9,622,483 B2 | 4/2017 | Bookbinder et al. |
| 9,682,885 B2 | 6/2017 | Gross |
| 9,783,453 B2 | 10/2017 | Gross |
| 9,802,857 B2 | 10/2017 | Bowden et al. |
| 9,815,733 B2 | 11/2017 | Dejneka et al. |
| 9,890,073 B2 | 2/2018 | Kase |
| 9,969,644 B2 | 5/2018 | Gross et al. |
| 9,975,803 B2 | 5/2018 | Gross |
| 10,017,412 B2 | 7/2018 | Bookbinder et al. |
| 2004/0107733 A1 | 6/2004 | Yashizawa |
| 2005/0223746 A1 | 10/2005 | Yoshizawa et al. |
| 2009/0098998 A1 | 4/2009 | Minazawa |
| 2009/0129061 A1 | 5/2009 | Fechner et al. |
| 2009/0325776 A1 | 12/2009 | Murata |
| 2010/0035745 A1 | 2/2010 | Murata |
| 2010/0215993 A1 | 8/2010 | Yagi et al. |
| 2011/0014475 A1 | 1/2011 | Murata |
| 2011/0092353 A1 | 4/2011 | Amin et al. |
| 2012/0108414 A1 | 5/2012 | Ruedinger et al. |
| 2012/0135226 A1 | 5/2012 | Bookbinder et al. |
| 2012/0277085 A1* | 11/2012 | Bookbinder ......... C03C 21/002 65/30.12 |
| 2013/0122284 A1 | 5/2013 | Gross |
| 2013/0186139 A1 | 7/2013 | Tanii |
| 2013/0224492 A1 | 8/2013 | Bookbinder et al. |
| 2013/0295353 A1 | 11/2013 | Drake et al. |
| 2013/0316162 A1 | 11/2013 | Murata et al. |
| 2013/0330599 A1 | 12/2013 | Kroll et al. |
| 2013/0343166 A1 | 12/2013 | Matsumoto et al. |
| 2014/0335331 A1 | 11/2014 | Ellison et al. |
| 2015/0064474 A1 | 3/2015 | Dejneka et al. |
| 2015/0079398 A1 | 3/2015 | Amin et al. |
| 2015/0140336 A1 | 5/2015 | Sakagami et al. |
| 2015/0147576 A1 | 5/2015 | Bookbinder et al. |
| 2015/0230476 A1 | 8/2015 | Bookbinder et al. |
| 2015/0259244 A1 | 9/2015 | Amin et al. |
| 2016/0122239 A1 | 5/2016 | Amin et al. |
| 2016/0137549 A1 | 5/2016 | Meiss et al. |
| 2016/0145152 A1 | 5/2016 | Martin et al. |
| 2016/0225396 A1 | 8/2016 | Shimojima |
| 2017/0008797 A1 | 1/2017 | Wagner |
| 2017/0217827 A1 | 8/2017 | Aitken et al. |
| 2017/0283304 A1 | 10/2017 | Yamazaki et al. |
| 2017/0361574 A1 | 12/2017 | Kiczenski et al. |
| 2018/0265398 A1 | 9/2018 | Yamazaki et al. |
| 2018/0282201 A1 | 10/2018 | Hancock et al. |
| 2018/0317496 A1 | 11/2018 | Bookbinder et al. |
| 2019/0152838 A1 | 5/2019 | Gross et al. |
| 2019/0195510 A1 | 6/2019 | Weiss et al. |
| 2019/0367408 A1 | 12/2019 | Harris et al. |
| 2020/0156996 A1 | 5/2020 | Gross et al. |
| 2020/0156997 A1 | 5/2020 | Gross et al. |
| 2020/0308047 A1 | 10/2020 | Glacki et al. |
| 2021/0214269 A1 | 7/2021 | Yuki |

FOREIGN PATENT DOCUMENTS

| | | |
|---|---|---|
| CN | 104411648 A | 3/2015 |
| CN | 105765499 A | 7/2016 |
| CN | 108341595 A | 7/2018 |
| DE | 4026814 A1 | 2/1992 |
| DE | 102016109085 A1 | 11/2017 |
| DE | 202018102537 U1 | 5/2018 |
| EP | 0690030 A1 | 1/1996 |
| EP | 0 885 856 A2 | 12/1998 |
| EP | 1 888 474 A1 | 2/2008 |
| GB | 1454335 A | 11/1976 |
| JP | 06-092674 B2 | 11/1994 |
| JP | 08-290936 A | 11/1996 |
| JP | 2001-226138 A | 8/2001 |
| JP | 2016-183091 A | 10/2016 |
| JP | 6474041 B2 | 2/2019 |
| SU | 1100252 A1 | 6/1984 |
| WO | 2007/013538 A1 | 2/2007 |
| WO | 2009/055745 A1 | 4/2009 |
| WO | 2014/201318 A1 | 12/2014 |
| WO | 2016/094282 A1 | 6/2016 |
| WO | 2016/104454 A1 | 6/2016 |
| WO | 2018/136388 A1 | 7/2018 |
| WO | 2019/055745 A1 | 3/2019 |
| WO | 2019/099814 A1 | 5/2019 |
| WO | 2020/102127 A2 | 5/2020 |
| WO | 2020/102147 A2 | 5/2020 |

OTHER PUBLICATIONS

Bartholomew; "Water in Glass"; Treatise on Materials Science and Technology; vol. 22, Glass III Eda. M. Tomozawa and RH Doremus. (Academic Press 1982) 75-127.

Chinese Patent Application No. 201880074555.7, Office Action, dated Mar. 8, 2022, 23 pages (12 pages of English Translation and 11 pages of Original Document), Chinese Patent Office.

Enss, "Investigations on the Dependency of the Relative Susceptibility of Glass to Attack by Water on its Chemical Composition", Glastech Ber. vol. 5, No. 11, p. 509, 1927.

Fett et al. "Effect of water on the inert strength of silica glass: role of water penetration", J Am Ceram Soc 95(12) 2012. pp. 3847-3853.

Fett et al. "Estimation of ion exchange layers for soda-lime-silicate glass from curvature measurements", J Mater Sci 41, 2006. pp. 5006-5010.

Fett et al. "Stresses in ion-exchange layers of soda-soda-lime-silicate glass", Fatigue Fract Engng Mater Struct 28, 2005. pp. 507-514.

Fett et al., "Interpretation of effects at the static fatigue limit of soda-lime-silicate glass" Engineering Fracture Mechanics, vol. 72, 2774-2791 (2005).

(56) References Cited

OTHER PUBLICATIONS

Gehrke et al.; "Fatigue Limit and Crack Arrest in Alkali-Containing Silicate Glasses" Journal of Materials Science; 26 (1991) pp. 5445-5455.

Haider et al., "The Diffusion of 'Water' Into Some Simple Silicate and Aluminosilicate Glasses at Temperatures Near the Transformation Range", Glass Technology vol. 11 No. 6, Dec. 1970, 6 pages.

International Search Report and Writien Opinion of the European International Searching Authority; PCT/US2019/060817; dated Apr. 8, 2020; 12 pgs.

International Search Report and Written Opinion of the International Searching Authority; PCT/US20/032422; dated Jul. 27, 2020; 13 pages; European Patent Office.

International Search Report and Written Opinion of the International Searching Authority; PCT/US2018/061500; dated Apr. 8, 2019, 9 pages; European Patent Office.

Invitation to Pay Additional Fees; PCT/US2019/060819; dated Apr. 8, 2020; 12 Pages; European International Searching Authority.

Invitation to Pay Additional Fees; PCT/US2019/060847; dated May 6, 2020; 13 Pages; European International Searching Authority.

Kuznetsova et al., "Effect of the Composition of Complex Silicate Glasses on Water and Gas Leaching", Fizika i khimiya Stekla, vol. 15, No. 2, pp. 245-251, 1989.

Lanford et al. "Hydration of soda-lime glass", Journal of Non-Crystalline Solids 33, 1979. pp. 249-266.

Leko, "Influence of Composition and Temperature on the Absorption Band Intensity for Water in Alkali Silicate Glasses", Glass Physics and Chemistry, vol. 23, No. 3, pp. 214-224, 1997.

Li and Tomozawa, "Mechanical strength increase of abraded silica glass by high pressure water vapor treatment", Journal of Non-Crystalline Solids 168 (1994) 287-292.

Liu et al. "Nanocrystal formation and photoluminescence in the Yb3 +/Er3 + codoped phosphosilicate glasses", Journal of Non-Crystalline Solids, 2014, vol. 383, p. 141-145.

Patent Cooperation Treaty, International Search Report and Written Opinion, for International Application US/2020/032422 (filed May 12, 2020), performed by European Patent Office, dated Jul. 27, 2020 (14 pgs).

Sarkisov et al., "Effect of the liquation structure on the chemical stability of glasses of the $SiO_2$-$CaO$-$Al_2O_3$-$K_2O$-$P_2O_5$ System", Phsyics and Chemistry of Glass 14(3) 1988, pp. 445-451.

Scholze, "Gases and Water in Glass",—Part Two; Institute for Glass and Ceramics, University of Berlin, Lectures on Glass and Technology Rensselaer Polytechnic Institute, Troy, N.Y, Mar. 30-Apr. 1, 1966, pp. 622-628.

Spierings, "The near Infared Absorption of Water in Glasses", Physics and Chemistry of Glasses, vol. 23, No. 4, pp. 129-134, Aug. 1982.

Steklo et al., "Molar Volumes and Refractive Indices of Water-Containing Aluminosilicate Glasses", Steklo, No. 2, pp. 65, 1978.

Takata et al., "Effect of Water Content on Mechanical Properties of $Na_2O$-$SiO_2$ Glasses," Communications of the American Ceramic Society, 1982, C-156-C157.

Takata, et al., "Effect of Water Content on Mechanical Properties Of $Na_2O$ -$SiO_2$ Glasses", Communications of the American Ceramic Society, (1982), Dages C-156-CI57.

Tsong, et al., "Evidence for Interdiffusion of Hydronium and Alkali Ions in Leached Glasses", Applied Physics Letters, vol. 39, (1981), pp. 669-670.

Wiederhorn et al. "Effect of water penetration on the strength and toughness of silica glass", J Am Ceram Soc 94(S1) 2011, pp. S196-S203.

Wiederhorn et al. "Volume expansion caused by water penetration into silica glass", J Am Ceram Soc 98(1) 2015, pp. 78-87.

Wiederhorn et al. "Water penetration—its effect on the strength and toughness of silica glass", Metallurgical and Materials Transactions A, 44A, Mar. 2013 pp. 1165-1174.

Yoko et al, "Hydration of silicate, phosphate and borate glasses in an autoclave", Riv. Staz. Sper. Vetro, vol. 14, No. 5, pp. 99-194, 1984.

Yoko et al., "Hydration of Silicate Glasses by Water Vapor at High Temperature", Glastech. Ber. vol. 56K, pt 1, pp. 650-655, 1983.

* cited by examiner

GLASS COMPOSITIONS AND METHODS WITH STEAM TREATMENT HAZE RESISTANCE

CROSS-REFERENCE TO RELATED APPLICATIONS

This application is a continuation of U.S. application Ser. No. 17/611,222 filed on Nov. 15, 2021, which claims the benefit of priority under 35 U.S.C. § 371 of International Application No. PCT/US2020/032422, filed on May 12, 2020, which claims the benefit of priority of U.S. Provisional Application Ser. No. 62/848,777 filed on May 16, 2019, the content of which is relied upon and incorporated herein by reference in its entirety.

BACKGROUND

Field

This disclosure relates to glass-based articles strengthened by steam treatment, alkali-free glass compositions utilized to form the glass-based articles, and methods of steam treatment to strengthen the glass-based articles.

Technical Background

Portable electronic devices, such as, smartphones, tablets, and wearable devices (such as, for example, watches and fitness trackers) continue to get smaller and more complex. As such, materials that are conventionally used on at least one external surface of such portable electronic devices also continue to get more complex. For instance, as portable electronic devices get smaller and thinner to meet consumer demand, the display covers and housings used in these portable electronic devices also get smaller and thinner, resulting in higher performance requirements for the materials used to form these components.

Accordingly, a need exists for materials that exhibit higher performance, such as resistance to damage, along with lower cost and ease of manufacture for use in portable electronic devices.

SUMMARY

In aspect (1), a glass-based article is provided. The glass-based article comprises: a hydrogen-containing layer extending from the surface of the glass-based article to a depth of layer, wherein a hydrogen concentration of the hydrogen-containing layer decreases from a maximum hydrogen concentration to the depth of layer; a compressive stress layer extending from the surface of the glass-based article to a depth of compression, wherein the compressive stress layer comprises a compressive stress of greater than or equal to 10 MPa; and a composition at the center of the glass-based article comprising:
  greater than or equal to 55 mol % to less than or equal to 70 mol % $SiO_2$,
  greater than or equal to 3 mol % to less than or equal to 17 mol % $Al_2O_3$,
  greater than or equal to 3 mol % to less than or equal to 15 mol % $P_2O_5$,
  greater than or equal to 1 mol % to less than or equal to 7 mol % $Li_2O$, and
  greater than or equal to 5 mol % to less than or equal to 20 mol % $K_2O$.

In aspect (2), the glass-based article of aspect (1) is provided, wherein the composition at the center of the glass-based article further comprises greater than or equal to 0 mol % to less than or equal to 1 mol % $Na_2O$.

In aspect (3), the glass-based article of aspect (1) or (2) is provided, wherein the composition at the center of the glass-based article further comprises greater than or equal to 0 mol % to less than or equal to 0.5 mol % $SnO_2$.

In aspect (4), the glass-based article of any of aspects (1) to (3) is provided, wherein the compressive stress layer comprises a compressive stress of greater than or equal to 50 MPa.

In aspect (5), the glass-based article of any of aspects (1) to (4) is provided, wherein the compressive stress layer comprises a compressive stress of greater than or equal to 300 MPa.

In aspect (6), the glass-based article of any of aspects (1) to (5) is provided, wherein the depth of compression is greater than or equal to 5 µm.

In aspect (7), the glass-based article of any of aspects (1) to (6) is provided, wherein the compressive stress layer comprises a compressive stress of greater than or equal to 300 MPa and the depth of compression is greater than or equal to 40 µm.

In aspect (8), the glass-based article of any of aspects (1) to (7) is provided, wherein the depth of compression is greater than or equal to 100 µm.

In aspect (9), the glass-based article of any of aspects (1) to (8) is provided, wherein a glass having a composition equivalent to the composition at the center of the article has a 200 P temperature of less than or equal to 1715° C.

In aspect (10), the glass-based article of any of aspects (1) to (9) is provided, wherein a glass having a composition equivalent to the composition at the center of the article has a liquidus viscosity of greater than or equal to 10 kP.

In aspect (11), the glass-based article of any of aspects (1) to (10) is provided, wherein a glass having a composition equivalent to the composition at the center of the article has a Young's modulus of greater than or equal to 50 GPa.

In aspect (12), the glass-based article of any of aspects (1) to (11) is provided, wherein the glass-based article has a thickness of less than or equal to 2 mm.

In aspect (13), the glass-based article of any of aspects (1) to (12) is provided, wherein the glass-based article has a substantially haze-free appearance.

In aspect (14), a consumer electronic product is provided. The consumer electronic product comprises: a housing comprising a front surface, a back surface and side surfaces; electrical components at least partially within the housing, the electrical components comprising at least a controller, a memory, and a display, the display at or adjacent the front surface of the housing; and a cover substrate disposed over the display. At least a portion of at least one of the housing and the cover substrate comprises the glass-based article of any of aspects (1) to (13).

In aspect (15), a glass is provided. The glass comprises:
  greater than or equal to 55 mol % to less than or equal to 70 mol % $SiO_2$,
  greater than or equal to 3 mol % to less than or equal to 17 mol % $Al_2O_3$,
  greater than or equal to 3 mol % to less than or equal to 15 mol % $P_2O_5$,
  greater than or equal to 1 mol % to less than or equal to 7 mol % $Li_2O$, and
  greater than or equal to 5 mol % to less than or equal to 20 mol % $K_2O$.

In aspect (16), the glass of aspect (15) is provided, further comprising greater than or equal to 0 mol % to less than or equal to 1 mol % $Na_2O$.

In aspect (17), the glass of aspect (15) or (16) is provided, further comprising greater than or equal to 0 mol % to less than or equal to 0.5 mol % $SnO_2$.

In aspect (18), the glass of any of aspects (15) to (17) is provided, comprising a 200 P temperature of less than or equal to 1715° C.

In aspect (19), the glass of any of aspects (15) to (18) is provided, comprising a liquidus viscosity of greater than or equal to 10 kP.

In aspect (20), the glass of any of aspects (15) to (19) is provided, comprising a Young's modulus of greater than or equal to 50 GPa.

In aspect (21), a method is provided. The method comprises: exposing a glass-based substrate to an environment with a temperature of greater than or equal to 200° C., and a pressure less than the water vapor saturation pressure at the temperature to form a glass-based article with compressive stress layer extending from the surface of the glass-based article to a depth of compression and a hydrogen-containing layer extending from the surface of the glass-based article to a depth of layer. The compressive stress layer comprises a compressive stress of greater than or equal to 10 MPa, a hydrogen concentration of the hydrogen-containing layer decreases from a maximum hydrogen concentration to the depth of layer.

In aspect (22), the method of aspect (21) is provided, wherein the glass-based article has a substantially haze-free appearance.

In aspect (23), the method of aspect (21) or (22) is provided, further comprising exposing the glass-based article to a saturated steam environment with a pressure greater than or equal to 1.0 MPa, and a temperature of greater than or equal to 150° C.

In aspect (24), the method of any of aspects (21) to (23) is provided, wherein the glass-based substrate comprises: greater than or equal to 55 mol % to less than or equal to 70 mol % $SiO_2$, greater than or equal to 3 mol % to less than or equal to 17 mol % $Al_2O_3$, greater than or equal to 3 mol % to less than or equal to 15 mol % $P_2O_5$, greater than or equal to 1 mol % to less than or equal to 7 mol % $Li_2O$, and greater than or equal to 5 mol % to less than or equal to 20 mol % $K_2O$.

In aspect (25), the method of any of aspects (21) to (24) is provided, wherein the glass-based substrate comprises greater than or equal to 0 mol % to less than or equal to 1 mol % $Na_2O$.

In aspect (26), the method of any of aspects (21) to (25) is provided, wherein the glass-based substrate comprises greater than or equal to 0 mol % to less than or equal to 0.5 mol % $SnO_2$.

In aspect (27), the method of any of aspects (21) to (26) is provided, wherein the compressive stress layer comprises a compressive stress of greater than or equal to 50 MPa.

In aspect (28), the method of any of aspects (21) to (27) is provided, wherein the compressive stress layer comprises a compressive stress of greater than or equal to 300 MPa.

In aspect (29), the method of any of aspects (21) to (28) is provided, wherein the depth of compression is greater than or equal to 5 μm.

In aspect (30), the method of any of aspects (21) to (29) is provided, wherein the depth of compression is greater than or equal to 100 μm.

In aspect (31), the method of any of aspects (21) to (30) is provided, wherein the glass-based article is not subjected to an ion-exchange treatment with an alkali ion source.

In aspect (32), a method is provided. The method comprises: exposing a glass-based substrate to a saturated water vapor environment with a temperature of greater than or equal to 85° C. to form a glass-based article with compressive stress layer extending from the surface of the glass-based article to a depth of compression and a hydrogen-containing layer extending from the surface of the glass-based article to a depth of layer. The compressive stress layer comprises a compressive stress of greater than or equal to 10 MPa, a hydrogen concentration of the hydrogen-containing layer decreases from a maximum hydrogen concentration to the depth of layer, and the glass-based substrate comprises:
greater than or equal to 55 mol % to less than or equal to 70 mol % $SiO_2$,
greater than or equal to 3 mol % to less than or equal to 17 mol % $Al_2O_3$,
greater than or equal to 3 mol % to less than or equal to 15 mol % $P_2O_5$,
greater than or equal to 1 mol % to less than or equal to 7 mol % $Li_2O$, and
greater than or equal to 5 mol % to less than or equal to 20 mol % $K_2O$.

In aspect (33), the method of aspect (32) is provided, wherein the glass-based substrate comprises greater than or equal to 0 mol % to less than or equal to 1 mol % $Na_2O$.

In aspect (34), the method of aspect (32) or (33) is provided, wherein the glass-based substrate comprises greater than or equal to 0 mol % to less than or equal to 0.5 mol % $SnO_2$.

In aspect (35), the method of any of aspects (32) to (34) is provided, wherein the compressive stress layer comprises a compressive stress of greater than or equal to 50 MPa.

In aspect (36), the method of any of aspects (32) to (35) is provided, wherein the compressive stress layer comprises a compressive stress of greater than or equal to 300 MPa.

In aspect (37), the method of any of aspects (32) to (36) is provided, wherein the depth of compression is greater than or equal to 5 μm.

In aspect (38), the method of any of aspects (32) to (37) is provided, wherein the depth of compression is greater than or equal to 100 μm.

In aspect (39), the method of any of aspects (32) to (38) is provided, wherein the glass-based article is not subjected to an ion-exchange treatment with an alkali ion source.

In aspect (40), the method of any of aspects (32) to (39) is provided, wherein the glass-based article has a substantially haze-free appearance.

These and other aspects, advantages, and salient features will become apparent from the following detailed description, the accompanying drawings, and the appended claims.

DETAILED DESCRIPTION

Figure 1:
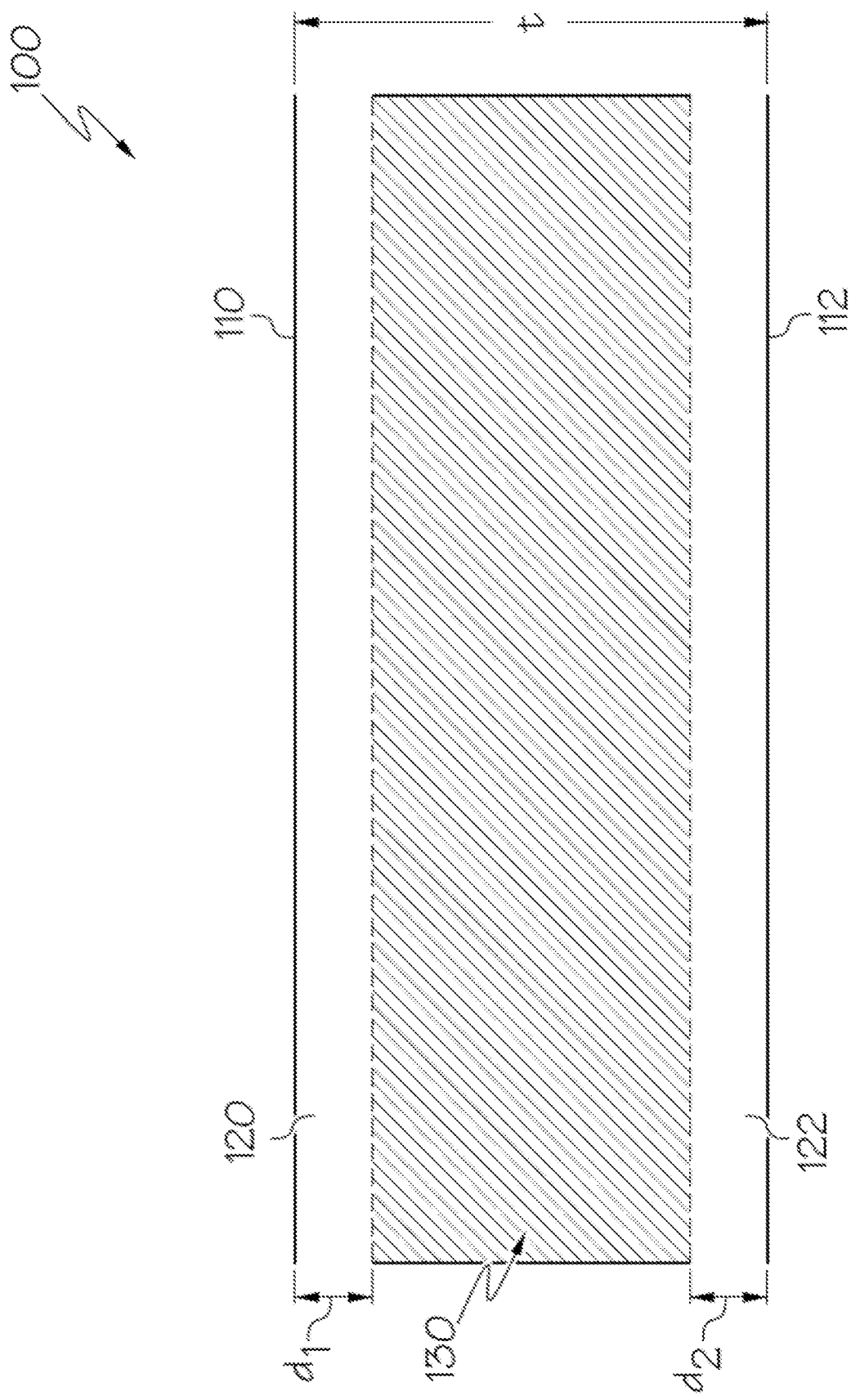
FIG. 1 is a representation of a cross-section of a glass-based article according to an embodiment.

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. Unless otherwise specified, a range of values, when recited, includes both the upper and lower limits of the range as well as any sub-ranges therebetween. As used herein, the indefinite articles "a," "an," and the corresponding definite article "the" mean "at least one" or "one or more," unless otherwise specified. It also is understood that the various features disclosed in the specification and the drawings can be used in any and all combinations.

As used herein, the term "glass-based" is used in its broadest sense to include any objects made wholly or partly of glass, including glass ceramics (which include a crystalline phase and a residual amorphous glass phase). Unless otherwise specified, all compositions of the glasses described herein are expressed in terms of mole percent (mol %), and the constituents are provided on an oxide basis. Unless otherwise specified, all temperatures are expressed in terms of degrees Celsius (° C.).

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. For example, a glass that is "substantially free of $K_2O$" is one in which $K_2O$ is not actively added or batched into the glass but may be present in very small amounts as a contaminant, such as in amounts of less than about 0.01 mol %. As utilized herein, when the term "about" is used to modify a value, the exact value is also disclosed. For example, the term "greater than about 10 mol %" also discloses "greater than or equal to 10 mol %."

Reference will now be made in detail to various embodiments, examples of which are illustrated in the accompanying examples and drawings.

The glass-based articles disclosed herein are formed by steam treating a glass-based substrate to produce a compressive stress layer extending from surface of the article to a depth of compression (DOC). The glass-based substrate compositions and the treatment methods are selected to avoid the formation of haze on the surface of the glass-based articles. The compressive stress layer includes a stress that decreases from a maximum stress to the depth of compression. In some embodiments, the maximum compressive stress may be located at the surface of the glass-based article. As used herein, depth of compression (DOC) means the depth at which the stress in the glass-based article changes from compressive to tensile. Thus, the glass-based article also contains a tensile stress region having a maximum central tension (CT), such that the forces within the glass-based article are balanced.

The glass-based articles further include a hydrogen-containing layer extending from a surface of the article to a depth of layer. The hydrogen-containing layer includes a hydrogen concentration that decreases from a maximum hydrogen concentration of the glass-based article to the depth of layer. In some embodiments, the maximum hydrogen concentration may be located at the surface of the glass-based article.

The glass-based articles may be formed by exposing glass-based substrates to environments containing water vapor, thereby allowing hydrogen species to penetrate the glass-based substrates and form the glass-based articles having a hydrogen-containing layer and/or a compressive stress layer. As utilized herein, hydrogen species includes molecular water, hydroxyl, hydrogen ions, and hydronium. The composition of the glass-based substrates may be selected to promote the interdiffusion of hydrogen species into the glass. As utilized herein, the term "glass-based substrate" refers to the precursor prior to exposure to a water vapor containing environment for the formation of a glass-based article that includes hydrogen-containing layers and/or compressive stress layers. Similarly, the term "glass-based article" refers to the post exposure article that includes a hydrogen-containing layer and/or a compressive stress layer.

The glass-based articles disclosed herein may exhibit a compressive stress layer without undergoing conventional ion exchange, thermal tempering, or lamination treatments. Ion exchange processes produces significant waste in the form of expended molten salt baths that require costly disposal, and also are applicable to only some glass compositions. Thermal tempering requires thick glass specimens as a practical matter, as thermal tempering of thin sheets utilizes small air gap quenching processes which results in sheet scratching damage that reduces performance and yield. Additionally, it is difficult to achieve uniform compressive stress across surface and edge regions when thermal tempering thin glass sheets. Laminate processes result in exposed tensile stress regions when large sheets are cut to usable sizes, which is undesirable.

The water vapor treatment utilized to form the glass-based articles allows for reduced waste and lower cost when compared to ion exchange treatments as molten salts are not utilized, and alkali-free glass-based substrates may be employed. The water vapor treatment is also capable of strengthening thin (<2 mm) low-cost glass that would not be suitable for thermal tempering at such thicknesses. Additionally, the water vapor treatment may be performed at the part level, avoiding the undesirable exposed tensile stress regions associated with laminate processes. In sum, the glass-based articles disclosed herein may be produced with a low thickness and at a low cost while exhibiting a high compressive stress and deep depth of compression.

A representative cross-section of a glass-based article 100 according to some embodiments is depicted in FIG. 1. The glass-based article 100 has a thickness t that extends between a first surface 110 and a second surface 112. A first compressive stress layer 120 extends from the first surface 110 to a first depth of compression, where the first depth of compression has a depth $d_1$ measured from the first surface 110 into the glass-based article 100. A second compressive stress layer 122 extends from the second surface 112 to a second depth of compression, where the second depth of compression has a depth $d_2$ measured from the second surface 112 into the glass-based article 100. A tensile stress region 130 is present between the first depth of compression and the second depth of compression. In embodiments, the first depth of compression $d_1$ may be substantially equivalent or equivalent to the second depth of compression $d_2$.

In some embodiments, the compressive stress layer of the glass-based article may include a compressive stress of at greater than or equal to 10 MPa, such as greater than or equal to 20 MPa, greater than or equal to 30 MPa, greater than or equal to 40 MPa, greater than or equal to 50 MPa, greater than or equal to 60 MPa, greater than or equal to 70 MPa, greater than or equal to 80 MPa, greater than or equal to 90 MPa, greater than or equal to 100 MPa, greater than or equal to 110 MPa, greater than or equal to 120 MPa, greater than or equal to 130 MPa, greater than or equal to 140 MPa, greater than or equal to 145 MPa, greater than or equal to 150 MPa, greater than or equal to 160 MPa, greater than or equal to 170 MPa, greater than or equal to 180 MPa, greater than or equal to 190 MPa, greater than or equal to 200 MPa, greater than or equal to 210 MPa, greater than or equal to 220 MPa, greater than or equal to 230 MPa, greater than or equal to 240 MPa, greater than or equal to 250 MPa, greater than or equal to 260 MPa, greater than or equal to 270 MPa, greater than or equal to 280 MPa, greater than or equal to 290 MPa, greater than or equal to 300 MPa, greater than or equal to 310 MPa, greater than or equal to 320 MPa, greater than or equal to 330 MPa, greater than or equal to 340 MPa, greater than or equal to 350 MPa, greater than or equal to 360 MPa, greater than or equal to 370 MPa, greater than or equal to 380 MPa, greater than or equal to 390 MPa, greater than or equal to 400 MPa, greater than or equal to 410 MPa, greater than or equal to 420 MPa, greater than or equal to 430 MPa, greater than or equal to 440 MPa, or more. In some embodiments, the compressive stress layer may include a compressive stress of from greater than or equal to 10 MPa to less than or equal to 450 MPa, such as from greater than or equal to 20 MPa to less than or equal to 440 MPa, from greater than or equal to 20 MPa to less than or equal to 430 MPa, from greater than or equal to 30 MPa to less than or equal to 420 MPa, from greater than or equal to 40 MPa to less than or equal to 410 MPa, from greater than or equal to 50 MPa to less than or equal to 400 MPa, from greater than or equal to 60 MPa to less than or equal to 390 MPa, from greater than or equal to 70 MPa to less than or equal to 380 MPa, from greater than or equal to 80 MPa to less than or equal to 370 MPa, from greater than or equal to 90 MPa to less than or equal to 360 MPa, from greater than or equal to 100 MPa to less than or equal to 350 MPa, from greater than or equal to 110 MPa to less than or equal to 340 MPa, from greater than or equal to 120 MPa to less than or equal to 330 MPa, from greater than or equal to 130 MPa to less than or equal to 320 MPa, from greater than or equal to 140 MPa to less than or equal to 310 MPa, from greater than or equal to 150 MPa to less than or equal to 300 MPa, from greater than or equal to 160 MPa to less than or equal to 290 MPa, from greater than or equal to 170 MPa to less than or equal to 280 MPa, from greater than or equal to 180 MPa to less than or equal to 270 MPa, from greater than or equal to 190 MPa to less than or equal to 260 MPa, from greater than or equal to 200 MPa to less than or equal to 250 MPa, from greater than or equal to 210 MPa to less than or equal to 240 MPa, from greater than or equal to 220 MPa to less than or equal to 230 MPa, or any sub-ranges formed from any of these endpoints.

In some embodiments, the DOC of the compressive stress layer may be greater than or equal to 5 µm, such as greater than or equal to 7 µm, greater than or equal to 10 µm, greater than or equal to 15 µm, greater than or equal to 20 µm, greater than or equal to 25 µm, greater than or equal to 30 µm, greater than or equal to 35 µm, greater than or equal to 40 µm, greater than or equal to 45 µm, greater than or equal to 50 µm, greater than or equal to 55 µm, greater than or equal to 60 µm, greater than or equal to 65 µm, greater than or equal to 70 µm, greater than or equal to 75 µm, greater than or equal to 80 µm, greater than or equal to 85 µm, greater than or equal to 90 µm, greater than or equal to 95 µm, greater than or equal to 100 µm, greater than or equal to 105 µm, greater than or equal to 110 µm, greater than or equal to 115 µm, greater than or equal to 120 µm, greater than or equal to 125 µm, greater than or equal to 130 µm, greater than or equal to 135 µm, greater than or equal to 140 µm, or more. In some embodiments, the DOC of the compressive stress layer may be from greater than or equal to 5 µm to less than or equal to 145 µm, such as from greater than or equal to 7 µm to less than or equal to 140 µm, from greater than or equal to 10 µm to less than or equal to 135 µm, from greater than or equal to 15 µm to less than or equal to 130 µm, from greater than or equal to 20 µm to less than or equal to 125 µm, from greater than or equal to 25 µm to less than or equal to 120 µm, from greater than or equal to 30 µm to less than or equal to 115 µm, from greater than or equal to 35 µm to less than or equal to 110 µm, from greater than or equal to 40 µm to less than or equal to 105 µm, from greater than or equal to 45 µm to less than or equal to 100 µm, from greater than or equal to 50 µm to less than or equal to 95 µm, from greater than or equal to 55 µm to less than or equal to 90 µm, from greater than or equal to 60 µm to less than or equal to 85 µm, from greater than or equal to 65 µm to less than or equal to 80 µm, from greater than or equal to 70 µm to less than or equal to 75 µm, or any sub-ranges that may be formed from any of these endpoints.

In some embodiments, the glass-based articles may exhibit a deep depth of compression and a high compressive stress. For example, the glass-based articles may have a depth of compression greater than or equal to 40 µm and a compressive stress of greater than or equal to 300 MPa.

In some embodiments, the glass-based articles may have a DOC greater than or equal to 0.05t, wherein t is the thickness of the glass-based article, such as greater than or equal to 0.06t, greater than or equal to 0.07t, greater than or equal to 0.08t, greater than or equal to 0.09t, greater than or equal to 0.10t, greater than or equal to 0.11t, greater than or equal to 0.12t, greater than or equal to 0.13t, greater than or equal to 0.14t, greater than or equal to 0.15t, greater than or equal to 0.16t, greater than or equal to 0.17t, greater than or equal to 0.18t, greater than or equal to 0.19t, or more. In some embodiments, the glass-based articles may have a DOC from greater than or equal to 0.05t to less than or equal to 0.20t, such as from greater than or equal to 0.06t to less than or equal to 0.19t, from greater than or equal to 0.07t to less than or equal to 0.18t, from greater than or equal to 0.08t to less than or equal to 0.17t, from greater than or equal to 0.09t to less than or equal to 0.16t, from greater than or equal to 0.10t to less than or equal to 0.15t, from greater than or equal to 0.11t to less than or equal to 0.14t, from greater than or equal to 0.12t to less than or equal to 0.13t, or any sub-ranges formed from any of these endpoints.

Compressive stress (including surface CS) is measured by surface stress meter using commercially available instruments such as the FSM-6000 (FSM), manufactured by Orihara Industrial Co., Ltd. (Japan). Surface stress measurements rely upon the accurate measurement of the stress optical coefficient (SOC), which is related to the birefringence of the glass. SOC in turn is measured according to Procedure C (Glass Disc Method) described in ASTM standard C770-16, entitled "Standard Test Method for Measurement of Glass Stress-Optical Coefficient," the contents of which are incorporated herein by reference in their entirety. DOC is measured by FSM. The maximum central tension (CT) values are measured using a scattered light polariscope (SCALP) technique known in the art.

The hydrogen-containing layer of the glass-based articles may have a depth of layer (DOL) greater than 5 µm. In some embodiments, the depth of layer may be greater than or equal to 10 µm, such as greater than or equal to 15 µm, greater than or equal to 20 µm, greater than or equal to 25 µm, greater than or equal to 30 µm, greater than or equal to 35 µm, greater than or equal to 40 µm, greater than or equal to 45 µm, greater than or equal to 50 µm, greater than or equal to 55 µm, greater than or equal to 60 µm, greater than or equal to 65 µm, greater than or equal to 70 µm, greater than or equal to 75 µm, greater than or equal to 80 µm, greater than or equal to 85 µm, greater than or equal to 90 µm, greater than or equal to 95 µm, or more. In some embodiments, the depth of layer may be from greater than 5 µm to less than or equal to 100 µm, such as from greater than or equal to 10 µm to less than or equal to 95 µm, from greater than or equal to 15 µm to less than or equal to 90 µm, from greater than or equal to 20 µm to less than or equal to 85 µm, from greater than or equal to 25 µm to less than or equal to 80 µm, from greater than or equal to 30 µm to less than or equal to 75 µm, from greater than or equal to 35 µm to less than or equal to 70 µm, from greater than or equal to 40 µm to less than or equal to 65 µm, from greater than or equal to 45 µm to less than or equal to 60 µm, from greater than or equal to 50 µm to less than or equal to 55 µm, or any sub-ranges formed by any of these endpoints. In general, the depth of layer exhibited by the glass-based articles is greater than the depth of layer that may be produced by exposure to the ambient environment.

The hydrogen-containing layer of the glass-based articles may have a depth of layer (DOL) greater than 0.005t, wherein t is the thickness of the glass-based article. In some embodiments, the depth of layer may be greater than or equal to 0.010t, such as greater than or equal to 0.015t, greater than or equal to 0.020t, greater than or equal to 0.025t, greater than or equal to 0.030t, greater than or equal to 0.035t, greater than or equal to 0.040t, greater than or equal to 0.045t, greater than or equal to 0.050t, greater than or equal to 0.055t, greater than or equal to 0.060t, greater than or equal to 0.065t, greater than or equal to 0.070t, greater than or equal to 0.075t, greater than or equal to 0.080t, greater than or equal to 0.085t, greater than or equal to 0.090t, greater than or equal to 0.095t, greater than or equal to 0.10t, greater than or equal to 0.15t, greater than or equal to 0.20t, or more. In some embodiments, the DOL may be from greater than 0.005t to less than or equal to 0.205t, such as from greater than or equal to 0.010t to less than or equal to 0.200t, from greater than or equal to 0.015t to less than or equal to 0.195t, from greater than or equal to 0.020t to less than or equal to 0.190t, from greater than or equal to 0.025t to less than or equal to 0.185t, from greater than or equal to 0.030t to less than or equal to 0.180t, from greater than or equal to 0.035t to less than or equal to 0.175t, from greater than or equal to 0.040t to less than or equal to 0.170t, from greater than or equal to 0.045t to less than or equal to 0.165t, from greater than or equal to 0.050t to less than or equal to 0.160t, from greater than or equal to 0.055t to less than or equal to 0.155t, from greater than or equal to 0.060t to less than or equal to 0.150t, from greater than or equal to 0.065t to less than or equal to 0.145t, from greater than or equal to 0.070t to less than or equal to 0.140t, from greater than or equal to 0.075t to less than or equal to 0.135t, from greater than or equal to 0.080t to less than or equal to 0.130t, from greater than or equal to 0.085t to less than or equal to 0.125t, from greater than or equal to 0.090t to less than or equal to 0.120t, from greater than or equal to 0.095t to less than or equal to 0.115t, from greater than or equal to 0.100t to less than or equal to 0.110t, or any sub-ranges formed by any of these endpoints.

The depth of layer and hydrogen concentration are measured by a secondary ion mass spectrometry (SIMS) technique that is known in the art. The SIMS technique is capable of measuring the hydrogen concentration at a given depth but is not capable of distinguishing the hydrogen species present in the glass-based article. For this reason, all hydrogen species contribute to the SIMS measured hydrogen concentration. As utilized herein, the depth of layer (DOL) refers to the first depth below the surface of the glass-based article where the hydrogen concentration is equal to the hydrogen concentration at the center of the glass-based article. This definition accounts for the hydrogen concentration of the glass-based substrate prior to treatment, such that the depth of layer refers to the depth of the hydrogen added by the treatment process. As a practical matter, the hydrogen concentration at the center of the glass-based article may be approximated by the hydrogen concentration at the depth from the surface of the glass-based article where the hydrogen concentration becomes substantially constant, as the hydrogen concentration is not expected to change between such a depth and the center of the glass-based article. This approximation allows for the determination of the DOL without measuring the hydrogen concentration throughout the entire depth of the glass-based article. The presence of the hydrogen-containing layer may be indicated by the formation of a compressive stress layer in the glass-based article as a result of the water vapor treatment.

Without wishing to be bound by any particular theory, the hydrogen-containing layer of the glass-based articles may be the result of an interdiffusion of hydrogen species for ions contained in the compositions of the glass-based substrate. Hydrogen-containing species, such as $H_3O^+$, $H_2O$, and/or $H^+$, may diffuse into the glass-based substrate to form the glass-based article. Water could penetrate the glass-based substrates by forming silanol groups, breaking the network structure and causing a volume expansion of the glass. Such a volume expansion may generate a compressive stress layer in the glass-based articles. The compressive stress and depth of compression of the compressive stress layer may depend on the composition of the glass-based substrate utilized to form the glass-based article, and the water vapor treatment conditions, such as temperature, pressure, water content, and duration. The stress profile of the glass-based articles produced by the water vapor treatment may be similar to stress profiles produced by potassium for sodium ion exchange strengthening processes.

The glass-based articles that have compressive stress layers also exhibit weight gain when compared to the glass-based substrates prior to the water vapor treatment process. The weight gain of the glass-based articles indicates the formation of a hydrogen-containing layer as a result of the water vapor treatment. The amount of weight gain is directly related to the amount of hydrogen species that enter the glass-based article as a result of the water vapor treatment process.

Figure 2A:
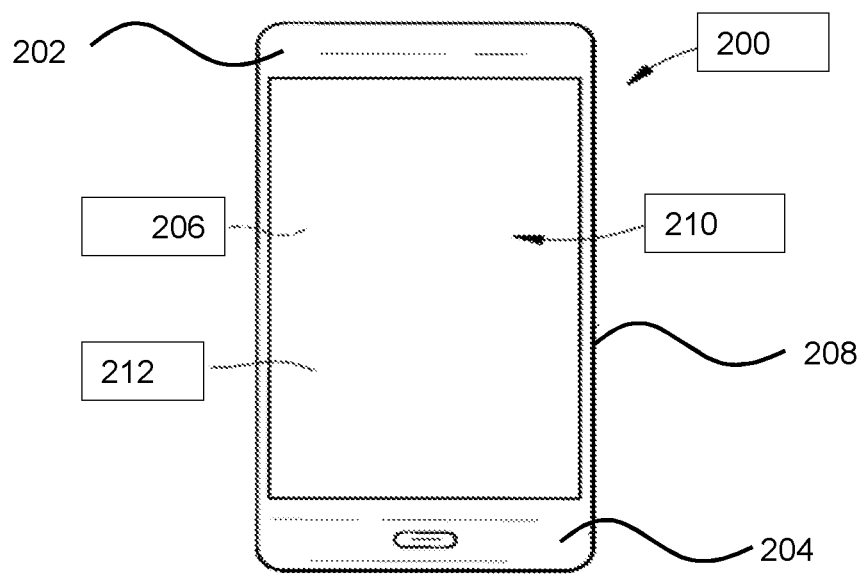
FIG. 2A is a plan view of an exemplary electronic device incorporating any of the glass-based articles disclosed herein.
Figure 2B:
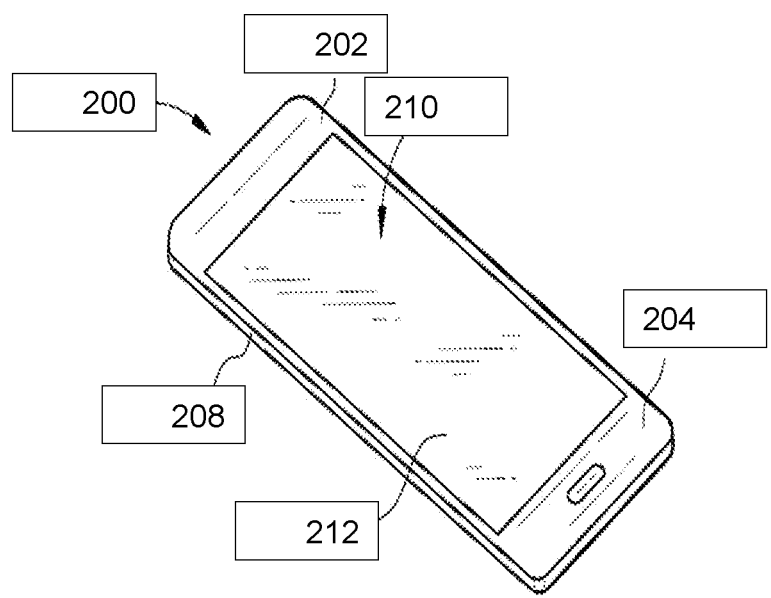
FIG. 2B is a perspective view of the exemplary electronic device of FIG. 2A.

The glass-based articles disclosed herein may be incorporated into another article such as an article with a display (or display articles) (e.g., consumer electronics, including mobile phones, tablets, computers, navigation systems, wearable devices (e.g., watches) and the like), architectural articles, transportation articles (e.g., automotive, trains, aircraft, sea craft, etc.), appliance articles, or any article that requires some transparency, scratch-resistance, abrasion resistance or a combination thereof. An exemplary article incorporating any of the glass-based articles disclosed herein is shown in FIGS. 2A and 2B. Specifically, FIGS. 2A and 2B show a consumer electronic device 200 including a housing 202 having front 204, back 206, and side surfaces 208; electrical components (not shown) that are at least partially inside or entirely within the housing and including at least a controller, a memory, and a display 210 at or adjacent to the front surface of the housing; and a cover substrate 212 at or over the front surface of the housing such that it is over the display. In some embodiments, at least a portion of at least one of the cover substrate 212 and the housing 202 may include any of the glass-based articles disclosed herein.

The glass-based articles may be formed from glass-based substrates having any appropriate composition. The composition of the glass-based substrate may be specifically selected to promote the diffusion of hydrogen-containing species, such that a glass-based article including a hydrogen-containing layer and a compressive stress layer may be formed efficiently, and to avoid the formation of haze as a result of the water vapor treatment process. In some embodiments, the glass-based substrates may have a composition that includes $SiO_2$, $Al_2O_3$, $P_2O_5$, and $Li_2O$, and $K_2O$. In some embodiments, the hydrogen species does not diffuse to the center of the glass-based article. Stated differently, the center of the glass-based article is the area least affected by the water vapor treatment. For this reason, the center of the glass-based article may have a composition that is substantially the same, or the same, as the composition of the glass-based substrate prior to treatment in the water containing environment.

The glass-based substrate may include any appropriate amount of $SiO_2$. $SiO_2$ is the largest constituent and, as such, $SiO_2$ is the primary constituent of the glass network formed from the glass composition. If the concentration of $SiO_2$ in the glass composition is too high, the formability of the glass composition may be diminished as higher concentrations of $SiO_2$ increase the difficulty of melting the glass, which, in turn, adversely impacts the formability of the glass. In some embodiments, the glass-based substrate may include $SiO_2$ in an amount from greater than or equal to 55 mol % to less than or equal to 70 mol %, such as from greater than or equal to 56 mol % to less than or equal to 69 mol %, from greater than or equal to 57 mol % to less than or equal to 68 mol %, from greater than or equal to 58 mol % to less than or equal to 67 mol %, from greater than or equal to 59 mol % to less than or equal to 66 mol %, from greater than or equal to 60 mol % to less than or equal to 65 mol %, from greater than or equal to 61 mol % to less than or equal to 64 mol %, from greater than or equal to 62 mol % to less than or equal to 63 mol %, 62 mol %, or any sub-ranges formed by any of these endpoints.

The glass-based substrate may include any appropriate amount of $Al_2O_3$. $Al_2O_3$ may serve as a glass network former, similar to $SiO_2$. $Al_2O_3$ may increase the viscosity of the glass composition due to its tetrahedral coordination in a glass melt formed from a glass composition, decreasing the formability of the glass composition when the amount of $Al_2O_3$ is too high. However, when the concentration of $Al_2O_3$ is balanced against the concentration of $SiO_2$ and the concentration of alkali oxides in the glass composition, $Al_2O_3$ can reduce the liquidus temperature of the glass melt, thereby enhancing the liquidus viscosity and improving the compatibility of the glass composition with certain forming processes, such as the fusion forming process. The inclusion of $Al_2O_3$ in the glass-based substrate prevents phase separation and reduces the number of non-bridging oxygens (NBOs) in the glass. Additionally, $Al_2O_3$ can improve the effectiveness of ion exchange. In some embodiments, the glass-based substrate may include $Al_2O_3$ in an amount of from greater than or equal to 3 mol % to less than or equal to 17 mol %, such as from greater than or equal to 4 mol % to less than or equal to 16 mol %, from greater than or equal to 5 mol % to less than or equal to 15 mol %, from greater than or equal to 6 mol % to less than or equal to 14 mol %, from greater than or equal to 7 mol % to less than or equal to 13 mol %, from greater than or equal to 8 mol % to less than or equal to 12 mol %, from greater than or equal to 9 mol % to less than or equal to 11 mol %, 10 mol %, or any sub-ranges formed by any of these endpoints.

The glass-based substrate may include any amount of $P_2O_5$ sufficient to produce the desired hydrogen diffusivity. The inclusion of phosphorous in the glass-based substrate promotes faster interdiffusion. Thus, the phosphorous containing glass-based substrates allow the efficient formation of glass-based articles including a hydrogen-containing layer. The inclusion of $P_2O_5$ also allows for the production of a glass-based article with a deep depth of layer (e.g., greater than about 10 μm) in a relatively short treatment time. In some embodiments, the glass-based substrate may include $P_2O_5$ in an amount of from greater than or equal to 3 mol % to less than or equal to 15 mol %, such as from greater than or equal to 4 mol % to less than or equal to 14 mol %, from greater than or equal to 5 mol % to less than or equal to 13 mol %, from greater than or equal to 6 mol % to less than or equal to 12 mol %, from greater than or equal to 7 mol % to less than or equal to 11 mol %, from greater than or equal to 8 mol % to less than or equal to 10 mol %, 9 mol %, or any sub-ranges formed by any of these endpoints.

The glass-based substrate may include $Li_2O$ in any appropriate amount. The inclusion of $Li_2O$ in the glass-based substrate increases the resistance of the glass-based article to haze formation as a result of steam strengthening. The content of $Li_2O$ in the glass-based substrate is directly correlated with reduction in the 200 P temperature of the glass-based substrate and the coefficient of thermal expansion of the glass-based substrate. In some embodiments, the glass-based substrate may include $Li_2O$ in an amount of from greater than or equal to 1 mol % to less than or equal to 7 mol %, such as from greater than or equal to 2 mol % to less than or equal to 6 mol %, from greater than or equal to 3 mol % to less than or equal to 5 mol %, 4 mol %, or any and all sub-ranges formed from these endpoints.

The glass-based substrate may include $K_2O$ in any appropriate amount. The inclusion of $K_2O$ in the glass-based substrate increases the steam strengthening susceptibility of the glass-based article to a greater degree than other alkali metal oxides. In some embodiments, the glass-based substrate may include $K_2O$ in an amount of from greater than or equal to 5 mol % to less than or equal to 20 mol %, such as from greater than or equal to 6 mol % to less than or equal to 19 mol %, from greater than or equal to 7 mol % to less than or equal to 18 mol %, from greater than or equal to 8 mol % to less than or equal to 17 mol %, from greater than or equal to 9 mol % to less than or equal to 16 mol %, from greater than or equal to 10 mol % to less than or equal to 15 mol %, from greater than or equal to 11 mol % to less than or equal to 14 mol %, from greater than or equal to 12 mol % to less than or equal to 13 mol %, or any and all sub-ranges formed from these endpoints.

The glass-based substrate may include $Na_2O$ in any appropriate amount. In some embodiments, the glass-based substrate may include $Na_2O$ in an amount of from greater than or equal to 0 mol % to less than or equal to 1 mol %. In embodiments, the glass-based substrate may be substantially free or free of $Na_2O$.

The glass-based substrates may additionally include a fining agent. In some embodiments, the fining agent may include tin. In embodiments, the glass-based substrate may include $SnO_2$ in an amount from greater than or equal to 0 mol % to less than or equal to 0.5 mol %, such as from greater than 0 mol % to less than or equal to 0.1 mol %. In embodiments, the glass-based substrate may be substantially free or free of $SnO_2$.

In some embodiments, the glass-based substrates may have a Young's modulus that is greater than or equal to 50 GPa. In embodiments, the glass-based substrates have a Young's modulus that is greater than or equal to 51 GPa, such as greater than or equal to 52 GPa, greater than or equal to 53 GPa, greater than or equal to 54 GPa, greater than or equal to 55 GPa, greater than or equal to 56 GPa, greater than or equal to 57 GPa, greater than or equal to 58 GPa, greater than or equal to 59 GPa, or more. In some embodiments, the glass-based substrates may have a Young's modulus in the range from greater than or equal to 50 GPa to less than or equal to 60 GPa, such as from greater than or equal to 51 GPa to less than or equal to 59 GPa, from greater than or equal to 52 GPa to less than or equal to 58 GPa, from greater than or equal to 53 GPa to less than or equal to 57 GPa, from greater than or equal to 54 GPa to less than or equal to 56 GPa, 55 GPa, or any and all sub-ranges formed from these endpoints.

In some embodiments, the glass-based substrates may have a 200 P temperature of less than or equal to 1715° C., such as less than or equal to 1710° C., less than or equal to 1705° C., less than or equal to 1700° C., less than or equal to 1695° C., less than or equal to 1690° C., less than or equal to 1685° C., less than or equal to 1680° C., less than or equal to 1675° C., less than or equal to 1670° C., less than or equal to 1665° C., less than or equal to 1660° C., less than or equal to 1655° C., less than or equal to 1650° C., or less. The low 200 P temperature improves the meltability and thereby manufacturability of the glass-based substrate compositions.

In some embodiments, the glass-based substrates may have a liquidus viscosity of greater than or equal to 10 kP, such as greater than or equal to 100 kP, greater than or equal to 1000 kP, or more. Increases in the $Li_2O$ content of the glass-based substrate decrease the liquidus viscosity of the glass-based substrate composition. Maintaining the liquidus viscosity of the glass-based substrate at greater than about 10 kP allows the glass-based substrates to be produced on a variety of manufacturing platforms. If the liquidus viscosity decreases too much, the manufacturability of the glass-based substrates is decreased.

The glass-based substrate may have any appropriate geometry. In some embodiments, the glass-based substrate may have a thickness of less than or equal to 2 mm, such as less than or equal to 1.9 mm, less than or equal to 1.8 mm, less than or equal to 1.7 mm, less than or equal to 1.6 mm, less than or equal to 1.5 mm, less than or equal to 1.4 mm, less than or equal to 1.3 mm, less than or equal to 1.2 mm, less than or equal to 1.1 mm, less than or equal to 1 mm, less than or equal to 900 µm, less than or equal to 800 µm, less than or equal to 700 µm, less than or equal to 600 µm, less than or equal to 500 µm, less than or equal to 400 µm, less than or equal to 300 µm, or less. In embodiments, the glass-based substrate may have a thickness from greater than or equal to 300 µm to less than or equal to 2 mm, such as from greater than or equal to 400 µm to less than or equal to 1.9 mm, from greater than or equal to 500 µm to less than or equal to 1.8 mm, from greater than or equal to 600 µm to less than or equal to 1.7 mm, from greater than or equal to 700 µm to less than or equal to 1.6 mm, from greater than or equal to 800 µm to less than or equal to 1.5 mm, from greater than or equal to 900 µm to less than or equal to 1.4 mm, from greater than or equal to 1 mm to less than or equal to 1.3 mm, from greater than or equal to 1.1 mm to less than or equal to 1.2 mm, or any and all sub-ranges formed from these endpoints. In some embodiments, the glass-based substrate may have a plate or sheet shape. In some other embodiments, the glass-based substrates may have a 2.5D or 3D shape. As utilized herein, a "2.5D shape" refers to a sheet shaped article with at least one major surface being at least partially nonplanar, and a second major surface being substantially planar. As utilized herein, a "3D shape" refers to an article with first and second opposing major surfaces that are at least partially nonplanar. The glass-based articles may have dimensions and shapes substantially similar or the same as the glass-based substrates from which they are formed.

The glass-based articles may be produced from the glass-based substrate by exposure to water vapor under any appropriate conditions. The exposure may be carried out in any appropriate device, such as a furnace with relative humidity control. The exposure may also be carried out at an elevated pressure, such as a furnace or autoclave with relative humidity and pressure control.

In some embodiments, the glass-based articles may be produced by exposing a glass-based substrate to an environment with a pressure greater than ambient pressure and containing water vapor. The environment may have a pressure greater than 0.1 MPa and a water partial pressure of greater than or equal to 0.05 MPa, such as greater than or equal to 0.075 MPa. The elevated pressure allows in the exposure environment allows for a higher concentration of water vapor in the environment, especially as temperatures are increased. As the temperature increases the amount of water available for diffusion into the glass-based substrates to form glass-based articles decreases for a fixed volume, such as the interior of a furnace or autoclave. Thus, while increasing the temperature of the water vapor treatment environment may increase the rate of diffusion of hydrogen species into the glass-based substrate, reduced total water vapor concentration and stress relaxation at higher temperatures produce decreased compressive stress when pressure is constant. As temperatures increase, such as those above the atmospheric pressure saturation condition, applying increased pressure to reach the saturation condition increases the concentration of water vapor in the environment significantly.

At atmospheric pressure (0.1 MPa), the water vapor saturation condition is 99.61° C. As the temperature increases the amount of water available for diffusion into the glass-based substrates to form glass-based articles decreases for a fixed volume, such as the interior of a furnace or autoclave. Thus, while increasing the temperature of the water vapor treatment environment may increase the rate of diffusion of hydrogen species into the glass-based substrate, reduced total water vapor concentration may reduce the effectiveness of the treatment.

Figure 3:
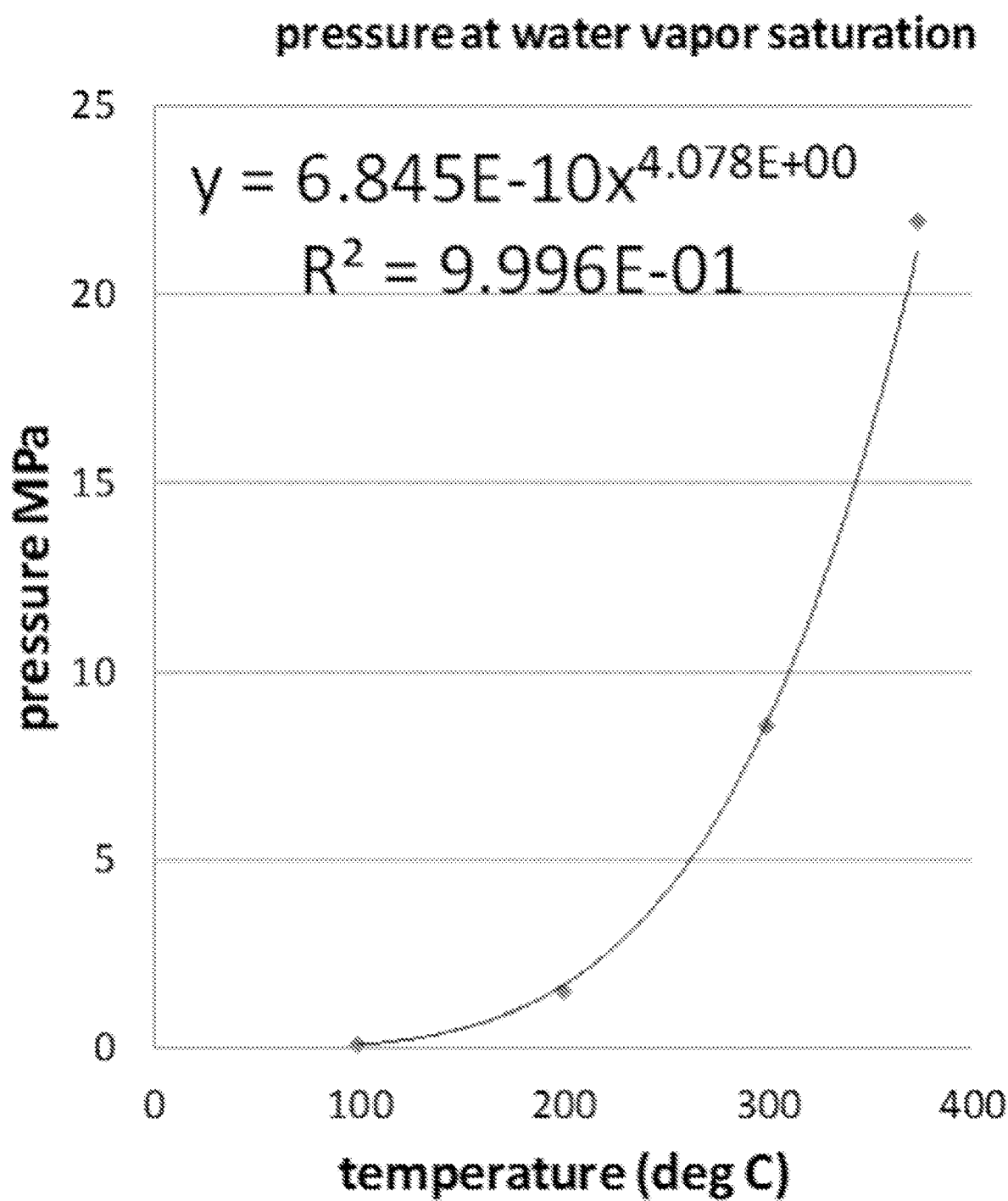
FIG. 3 is a plot of the saturation condition for water as a function or pressure and temperature.

As temperatures increase, such as those above the atmospheric pressure saturation condition, applying increased pressure to reach the saturation condition increases the concentration of water vapor in the environment significantly. The saturation condition for water vapor as a function of pressure and temperature is shown in FIG. 3. As shown in FIG. 3, the regions above the curve will result in condensation of water vapor into liquid which is undesirable. Thus, the water vapor treatment conditions utilized herein may preferably fall on or under the curve in FIG. 3, with further preferred conditions being on or just under the curve to maximize water vapor content. For these reasons, the water vapor treatment of the glass-based substrates may be carried out at elevated pressure.

High temperature and pressure conditions have been shown to produce glass-based articles with a hazy appearance. The hazy appearance is correlated to the concentration of added hydrogen species in the glass-based article, with higher temperature and pressure conditions producing higher concentrations of hydrogen species in the glass-based article. The formation of haze during the water treatment process may be addressed by utilizing the lithium containing compositions described herein or by selecting the treatment conditions to manage the amount of hydrogen species added to the glass-based article. For example, at high temperatures treatment pressures below the saturation pressure may be utilized to reduce the concentration of hydrogen species in the glass-based article. The concentration of the hydrogen species may be reduced by decreasing the total amount of hydrogen species diffused into the glass-based article, as evidenced by reduced weight gain during water vapor treatment, or by increasing the depth of layer for the same amount of weight gain. The approaches for mitigating haze, composition and treatment conditions, may be utilized in conjunction.

In some embodiments, the lithium containing glass-based substrates described herein may be exposed to a water vapor treatment in a saturated steam environment at a temperature of greater than or equal to 85° C. The glass-based substrates containing lithium allow the use of a wider process window with higher temperatures and pressures while avoiding haze, thereby decreasing treatment times and increasing the efficiency of the strengthening process. In other embodiments, a nonsaturated steam environment may be employed for the water vapor treatment, with a temperature of greater than or equal to 200° C. The non-saturated condition may produce substantially haze-free or haze-free glass-based articles even when glass-based substrates that do not include lithium are utilized. The glass-based articles produced utilizing these haze mitigation strategies are substantially haze-free or haze-free in appearance.

In some embodiments, the glass-based substrates may be exposed to an environment at a pressure greater than or equal to 0.1 MPa, such as greater than or equal to 0.2 MPa, greater than or equal to 0.3 MPa, greater than or equal to 0.4 MPa, greater than or equal to 0.5 MPa, greater than or equal to 0.6 MPa, greater than or equal to 0.7 MPa, greater than or equal to 0.8 MPa, greater than or equal to 0.9 MPa, greater than or equal to 1.0 MPa, greater than or equal to 1.1 MPa, greater than or equal to 1.2 MPa, greater than or equal to 1.3 MPa, greater than or equal to 1.4 MPa, greater than or equal to 1.5 MPa, greater than or equal to 1.6 MPa, greater than or equal to 1.7 MPa, greater than or equal to 1.8 MPa, greater than or equal to 1.9 MPa, greater than or equal to 2.0 MPa, greater than or equal to 2.1 MPa, greater than or equal to 2.2 MPa, greater than or equal to 2.3 MPa, greater than or equal to 2.4 MPa, greater than or equal to 2.5 MPa, greater than or equal to 2.6 MPa, greater than or equal to 2.7 MPa, greater than or equal to 2.8 MPa, greater than or equal to 2.9 MPa, greater than or equal to 3.0 MPa, greater than or equal to 3.1 MPa, greater than or equal to 3.2 MPa, greater than or equal to 3.3 MPa, greater than or equal to 3.4 MPa, greater than or equal to 3.5 MPa, greater than or equal to 1.6 MPa, greater than or equal to 3.7 MPa, greater than or equal to 3.8 MPa, greater than or equal to 3.9 MPa, greater than or equal to 4.0 MPa, greater than or equal to 4.1 MPa, greater than or equal to 4.2 MPa, greater than or equal to 4.3 MPa, greater than or equal to 4.4 MPa, greater than or equal to 4.5 MPa, greater than or equal to 4.6 MPa, greater than or equal to 4.7 MPa, greater than or equal to 4.8 MPa, greater than or equal to 4.9 MPa, greater than or equal to 5.0 MPa, greater than or equal to 5.1 MPa, greater than or equal to 5.2 MPa, greater than or equal to 5.3 MPa, greater than or equal to 5.4 MPa, greater than or equal to 5.5 MPa, greater than or equal to 5.6 MPa, greater than or equal to 5.7 MPa, greater than or equal to 5.8 MPa, greater than or equal to 5.9 MPa, greater than or equal to 6.0 MPa, or more. In embodiments, the glass-based substrates may be exposed to an environment at a pressure of from greater than or equal to 0.1 MPa to less than or equal to 25 MPa, such as from greater than or equal to 0.2 MPa to less than or equal to 24 MPa, from greater than or equal to 0.3 MPa to less than or equal to 23 MPa, from greater than or equal to 0.4 MPa to less than or equal to 22 MPa, from greater than or equal to 0.5 MPa to less than or equal to 21 MPa, from greater than or equal to 0.6 MPa to less than or equal to 20 MPa, from greater than or equal to 0.7 MPa to less than or equal to 19 MPa, from greater than or equal to 0.8 MPa to less than or equal to 18 MPa, from greater than or equal to 0.9 MPa to less than or equal to 17 MPa, from greater than or equal to 1.0 MPa to less than or equal to 16 MPa, from greater than or equal to 1.1 MPa to less than or equal to 15 MPa, from greater than or equal to 1.2 MPa to less than or equal to 14 MPa, from greater than or equal to 1.3 MPa to less than or equal to 13 MPa, from greater than or equal to 1.4 MPa to less than or equal to 12 MPa, from greater than or equal to 1.5 MPa to less than or equal to 11 MPa, from greater than or equal to 1.6 MPa to less than or equal to 10 MPa, from greater than or equal to 1.7 MPa to less than or equal to 9 MPa, from greater than or equal to 1.8 MPa to less than or equal to 8 MPa, from greater than or equal to 1.9 MPa to less than or equal to 7 MPa, from greater than or equal to 1.9 MPa to less than or equal to 6.9 MPa, from greater than or equal to 2.0 MPa to less than or equal to 6.8 MPa, from greater than or equal to 2.1 MPa to less than or equal to 6.7 MPa, from greater than or equal to 2.2 MPa to less than or equal to 6.6 MPa, from greater than or equal to 2.3 MPa to less than or equal to 6.5 MPa, from greater than or equal to 2.4 MPa to less than or equal to 6.4 MPa, from greater than or equal to 2.5 MPa to less than or equal to 6.3 MPa, from greater than or equal to 2.6 MPa to less than or equal to 6.2 MPa, from greater than or equal to 2.7 MPa to less than or equal to 6.1 MPa, from greater than or equal to 2.8 MPa to less than or equal to 6.0 MPa, from greater than or equal to 2.9 MPa to less than or equal to 5.9 MPa, from greater than or equal to 3.0 MPa to less than or equal to 5.8 MPa, from greater than or equal to 3.1 MPa to less than or equal to 5.7 MPa, from greater than or equal to 3.2 MPa to less than or equal to 5.6 MPa, from greater than or equal to 3.3 MPa to less than or equal to 5.5 MPa, from greater than or equal to 3.4 MPa to less than or equal to 5.4 MPa, from greater than or equal to 3.5 MPa to less than or equal to 5.3 MPa, from greater than or equal to 3.6 MPa to less than or equal to 5.2 MPa, from greater than or equal to 3.7 MPa to less than or equal to 5.1 MPa, from greater than or equal to 3.8 MPa to less than or equal to 5.0 MPa, from greater than or equal to 3.9 MPa to less than or equal to 4.9 MPa, from greater than or equal to 4.0 MPa to less than or equal to 4.8 MPa, from greater than or equal to 4.1 MPa to less than or equal to 4.7 MPa, from greater than or equal to 4.2 MPa to less than or equal to 4.6 MPa, from greater than or equal to 4.3 MPa to less than or equal to 4.5 MPa, 4.4 MPa, or any and all sub-ranges formed from any of these endpoints.

In some embodiments, the glass-based substrates may be exposed to an environment with a water partial pressure greater than or equal to 0.05 MPa, such as greater than or equal to 0.075 MPa, greater than or equal to 0.1 MPa, greater than or equal to 0.2 MPa, greater than or equal to 0.3 MPa, greater than or equal to 0.4 MPa, greater than or equal to 0.5 MPa, greater than or equal to 0.6 MPa, greater than or equal to 0.7 MPa, greater than or equal to 0.8 MPa, greater than or equal to 0.9 MPa, greater than or equal to 1.0 MPa, greater than or equal to 1.1 MPa, greater than or equal to 1.2 MPa, greater than or equal to 1.3 MPa, greater than or equal to 1.4 MPa, greater than or equal to 1.5 MPa, greater than or equal to 1.6 MPa, greater than or equal to 1.7 MPa, greater than or equal to 1.8 MPa, greater than or equal to 1.9 MPa, greater than or equal to 2.0 MPa, greater than or equal to 2.1 MPa, greater than or equal to 2.2 MPa, greater than or equal to 2.3 MPa, greater than or equal to 2.4 MPa, greater than or equal to 2.5 MPa, greater than or equal to 2.6 MPa, greater than or equal to 2.7 MPa, greater than or equal to 2.8 MPa, greater than or equal to 2.9 MPa, greater than or equal to 3.0 MPa, greater than or equal to 3.1 MPa, greater than or equal to 3.2 MPa, greater than or equal to 3.3 MPa, greater than or equal to 3.4 MPa, greater than or equal to 3.5 MPa, greater than or equal to 1.6 MPa, greater than or equal to 3.7 MPa, greater than or equal to 3.8 MPa, greater than or equal to 3.9 MPa, greater than or equal to 4.0 MPa, greater than or equal to 4.1 MPa, greater than or equal to 4.2 MPa, greater than or equal to 4.3 MPa, greater than or equal to 4.4 MPa, greater than or equal to 4.5 MPa, greater than or equal to 4.6 MPa, greater than or equal to 4.7 MPa, greater than or equal to 4.8 MPa, greater than or equal to 4.9 MPa, greater than or equal to 5.0 MPa, greater than or equal to 5.1 MPa, greater than or equal to 5.2 MPa, greater than or equal to 5.3 MPa, greater than or equal to 5.4 MPa, greater than or equal to 5.5 MPa, greater than or equal to 5.6 MPa, greater than or equal to 5.7 MPa, greater than or equal to 5.8 MPa, greater than or equal to 5.9 MPa, greater than or equal to 6.0 MPa, greater than or equal to 7.0 MPa, greater than or equal to 8.0 MPa, greater than or equal to 9.0 MPa, greater than or equal to 10.0 MPa, greater than or equal to 11.0 MPa, greater than or equal to 12.0 MPa, greater than or equal to 13.0 MPa, greater than or equal to 14.0 MPa, greater than or equal to 15.0 MPa, greater than or equal to 16.0 MPa, greater than or equal to 17.0 MPa, greater than or equal to 18.0 MPa, greater than or equal to 19.0 MPa, greater than or equal to 20.0 MPa, greater than or equal to 21.0 MPa, greater than or equal to 22.0 MPa, or more. In embodiments, the glass-based substrates may be exposed to an environment with a water partial pressure from greater than or equal to 0.05 MPa to less than or equal to 22 MPa, such as from greater than or equal to 0.075 MPa to less than or equal to 22 MPa, from greater than or equal to 0.1 MPa to less than or equal to 21 MPa, from greater than or equal to 0.2 MPa to less than or equal to 20 MPa, from greater than or equal to 0.3 MPa to less than or equal to 19 MPa, from greater than or equal to 0.4 MPa to less than or equal to 18 MPa, from greater than or equal to 0.5 MPa to less than or equal to 17 MPa, from greater than or equal to 0.6 MPa to less than or equal to 16 MPa, from greater than or equal to 0.7 MPa to less than or equal to 15 MPa, from greater than or equal to 0.8 MPa to less than or equal to 14 MPa, from greater than or equal to 0.9 MPa to less than or equal to 13 MPa, from greater than or equal to 1.0 MPa to less than or equal to 12 MPa, from greater than or equal to 1.1 MPa to less than or equal to 11 MPa, from greater than or equal to 1.2 MPa to less than or equal to 10 MPa, from greater than or equal to 1.3 MPa to less than or equal to 9 MPa, from greater than or equal to 1.4 MPa to less than or equal to 8 MPa, from greater than or equal to 1.5 MPa to less than or equal to 7 MPa, from greater than or equal to 1.6 MPa to less than or equal to 6.9 MPa, from greater than or equal to 1.7 MPa to less than or equal to 6.8 MPa, from greater than or equal to 1.8 MPa to less than or equal to 6.7 MPa, from greater than or equal to 1.9 MPa to less than or equal to 6.6 MPa, from greater than or equal to 2.0 MPa to less than or equal to 6.5 MPa, from greater than or equal to 2.1 MPa to less than or equal to 6.4 MPa, from greater than or equal to 2.2 MPa to less than or equal to 6.3 MPa, from greater than or equal to 2.3 MPa to less than or equal to 6.2 MPa, from greater than or equal to 2.4 MPa to less than or equal to 6.1 MPa, from greater than or equal to 2.5 MPa to less than or equal to 6.0 MPa, from greater than or equal to 2.6 MPa to less than or equal to 5.9 MPa, from greater than or equal to 2.7 MPa to less than or equal to 5.8 MPa, from greater than or equal to 2.8 MPa to less than or equal to 5.7 MPa, from greater than or equal to 2.9 MPa to less than or equal to 5.6 MPa, from greater than or equal to 3.0 MPa to less than or equal to 5.5 MPa, from greater than or equal to 3.1 MPa to less than or equal to 5.4 MPa, from greater than or equal to 3.2 MPa to less than or equal to 5.3 MPa, from greater than or equal to 3.3 MPa to less than or equal to 5.2 MPa, from greater than or equal to 3.4 MPa to less than or equal to 5.1 MPa, from greater than or equal to 3.5 MPa to less than or equal to 5.0 MPa, from greater than or equal to 3.6 MPa to less than or equal to 4.9 MPa, from greater than or equal to 3.7 MPa to less than or equal to 4.8 MPa, from greater than or equal to 3.8 MPa to less than or equal to 4.7 MPa, from greater than or equal to 3.9 MPa to less than or equal to 4.6 MPa, from greater than or equal to 4.0 MPa to less than or equal to 4.5 MPa, from greater than or equal to 4.1 MPa to less than or equal to 4.4 MPa, from greater than or equal to 4.2 MPa to less than or equal to 4.3 MPa, or any and all sub-ranges formed from any of these endpoints.

In some embodiments, the glass-based substrates may be exposed to an environment with a relative humidity of greater than or equal to 10%, such as greater than or equal to 25%, greater than or equal to 50%, greater than or equal to 75%, greater than or equal to 80%, greater than or equal to 85%, greater than or equal to 90%, greater than or equal to 95%, greater than or equal to 99%, or more. In some embodiments, the glass-based substrate may be exposed to an environment with 100% relative humidity. In some embodiments, the environment may be a saturated steam environment.

In some embodiments, the glass-based substrates may be exposed to an environment at with a temperature of greater than or equal to 85° C., such as greater than or equal to 90° C., greater than or equal to 100° C., greater than or equal to 110° C., greater than or equal to 120° C., greater than or equal to 130° C., greater than or equal to 140° C., greater than or equal to 150° C., greater than or equal to 160° C., greater than or equal to 170° C., greater than or equal to 180° C., greater than or equal to 190° C., greater than or equal to 200° C., greater than or equal to 210° C., greater than or equal to 220° C., greater than or equal to 230° C., greater than or equal to 240° C., greater than or equal to 250° C., greater than or equal to 260° C., greater than or equal to 270° C., greater than or equal to 280° C., greater than or equal to 290° C., greater than or equal to 300° C., greater than or equal to 310° C., greater than or equal to 320° C., greater than or equal to 330° C., greater than or equal to 340° C., greater than or equal to 350° C., greater than or equal to 360° C., greater than or equal to 370° C., greater than or equal to 380° C., greater than or equal to 390° C., greater than or equal to 400° C., or more. In some embodiments, the glass-based substrates may be exposed to an environment with a temperature from greater than or equal to 85° C. to less than or equal to 400° C., such as from greater than or equal to 100° C. to less than or equal to 390° C., from greater than or equal to 110° C. to less than or equal to 380° C., from greater than or equal to 115° C. to less than or equal to 370° C., from greater than or equal to 120° C. to less than or equal to 360° C., from greater than or equal to 125° C. to less than or equal to 350° C., from greater than or equal to 130° C. to less than or equal to 340° C., from greater than or equal to 135° C. to less than or equal to 330° C., from greater than or equal to 140° C. to less than or equal to 320° C., from greater than or equal to 145° C. to less than or equal to 310° C., from greater than or equal to 150° C. to less than or equal to 300° C., from greater than or equal to 155° C. to less than or equal to 295° C., from greater than or equal to 160° C. to less than or equal to 290° C., from greater than or equal to 165° C. to less than or equal to 285° C., from greater than or equal to 170° C. to less than or equal to 280° C., from greater than or equal to 175° C. to less than or equal to 275° C., from greater than or equal to 180° C. to less than or equal to 270° C., from greater than or equal to 185° C. to less than or equal to 265° C., from greater than or equal to 190° C. to less than or equal to 260° C., from greater than or equal to 195° C. to less than or equal to 255° C., from greater than or equal to 200° C. to less than or equal to 250° C., from greater than or equal to 205° C. to less than or equal to 245° C., from greater than or equal to 210° C. to less than or equal to 240° C., from greater than or equal to 215° C. to less than or equal to 235° C., from greater than or equal to 220° C. to less than or equal to 230° C., 225° C., or any and all sub-ranges formed from any of these endpoints.

In some embodiments, the glass-based substrate may be exposed to the water vapor containing environment for a time period sufficient to produce the desired degree of hydrogen-containing species diffusion and the desired compressive stress layer. In some embodiments, the glass-based substrate may be exposed to the water vapor containing environment for greater than or equal to 2 hours, such as greater than or equal to 4 hours, greater than or equal to 6 hours, greater than or equal to 8 hours, greater than or equal to 10 hours, greater than or equal to 12 hours, greater than or equal to 14 hours, greater than or equal to 16 hours, greater than or equal to 18 hours, greater than or equal to 20 hours, greater than or equal to 22 hours, greater than or equal to 24 hours, greater than or equal to 30 hours, greater than or equal to 36 hours, greater than or equal to 42 hours, greater than or equal to 48 hours, greater than or equal to 54 hours, greater than or equal to 60 hours, greater than or equal to 66 hours, greater than or equal to 72 hours, greater than or equal to 78 hours, greater than or equal to 84 hours, greater than or equal to 90 hours, greater than or equal to 96 hours, greater than or equal to 102 hours, greater than or equal to 108 hours, greater than or equal to 114 hours, greater than or equal to 120 hours, greater than or equal to 126 hours, greater than or equal to 132 hours, greater than or equal to 138 hours, greater than or equal to 144 hours, greater than or equal to 150 hours, greater than or equal to 156 hours, greater than or equal to 162 hours, greater than or equal to 168 hours, or more. In some embodiments, the glass-based substrate may be exposed to the water vapor containing environment for a time period from greater than or equal to 2 hours to less than or equal to 10 days, such as from greater than or equal to 4 hours to less than or equal to 9 days, from greater than or equal to 6 hours to less than or equal to 8 days, from greater than or equal to 8 hours to less than or equal to 168 hours, from greater than or equal to 10 hours to less than or equal to 162 hours, from greater than or equal to 12 hours to less than or equal to 156 hours, from greater than or equal to 14 hours to less than or equal to 150 hours, from greater than or equal to 16 hours to less than or equal to 144 hours, from greater than or equal to 18 hours to less than or equal to 138 hours, from greater than or equal to 20 hours to less than or equal to 132 hours, from greater than or equal to 22 hours to less than or equal to 126 hours, from greater than or equal to 24 hours to less than or equal to 120 hours, from greater than or equal to 30 hours to less than or equal to 114 hours, from greater than or equal to 36 hours to less than or equal to 108 hours, from greater than or equal to 42 hours to less than or equal to 102 hours, from greater than or equal to 48 hours to less than or equal to 96 hours, from greater than or equal to 54 hours to less than or equal to 90 hours, from greater than or equal to 60 hours to less than or equal to 84 hours, from greater than or equal to 66 hours to less than or equal to 78 hours, 72 hours, or any and all sub-ranges formed from any of these endpoints.

In some embodiments, the glass-based substrates may be exposed to multiple water vapor containing environments. In embodiments, the glass-based substrate may be exposed to a first environment to form a first glass-based article with a first compressive stress layer extending from a surface of the first glass-based article to a first depth of compression, and the first glass-based article may then be exposed to a second environment to form a second glass-based article with a second compressive stress layer extending from a surface of the second glass-based article to a second depth of compression. The first environment has a first water partial pressure and a first temperature, and the glass-based substrate is exposed to the first environment for a first time period. The second environment has a second water partial pressure and a second temperature, and the first glass-based article is exposed to the second environment for a second time period.

The first water partial pressure and the second water partial pressure may be any appropriate partial pressure, such as greater than or equal to 0.05 MPa or greater than or equal to 0.075 MPa. The first and second partial pressure may be any of the values disclosed herein with respect to the water partial pressures employed in the elevated pressure method. In embodiments, the first and second environments may have, independently, a relative humidity of greater than or equal to 10%, such as greater than or equal to 25%, greater than or equal to 50%, greater than or equal to 75%, greater than or equal to 80%, greater than or equal to 90%, greater than or equal to 95%, or equal to 100%. In some embodiments, at least one of the first environment and the second environment has a relative humidity of 100%. In embodiments, the first and second environments may be, independently, a saturated steam environment.

The first compressive stress layer includes a first maximum compressive stress, and the second compressive stress layer includes a second maximum compressive stress. In embodiments, the first maximum compressive stress is less than the second maximum compressive stress. The second maximum compressive stress may be compared to a compressive stress "spike" of the type formed through multi-step or mixed bath ion exchange techniques. The first and second maximum compressive stress may have any of the values disclosed herein with respect to the compressive stress of the glass-based article. In embodiments, the second maximum compressive stress may be greater than or equal to 50 MPa.

The first depth of compression may be less than or equal to the second depth of compression. In some embodiments, the first depth of compression is less than the second depth of compression. The first depth of compression and the second depth of compression may have any of the values disclosed herein with respect to the depth of compression. In embodiments, the second depth of compression is greater than 5 µm.

The first temperature may be greater than or equal to the second temperature. In embodiments, the first temperature is greater than the second temperature. The first and second temperatures may be any of the temperatures disclosed in connection with the elevated pressure method.

The first time period may be less than or equal to the second time period. In embodiments, the first time period is less than the second time period. The first and second time periods may be any of the time periods disclosed in connection with the elevated pressure method.

In embodiments, any or all of the multiple exposures to a water vapor containing environment may be performed at an elevated pressure. For example, at least one of the first environment and the second environment may have a pressure greater than 0.1 MPa. The first and second environments may have any pressure disclose in connection with the elevated pressure method.

In some embodiments, the multiple water vapor environment exposure technique may include more than two exposure environments. In embodiments, the second glass-based article may be exposed to a third environment to form a third glass-based article. The third environment has a third water partial pressure and a third temperature, and the second glass-based article is exposed to the third environment for a third time period. The third glass-based article includes a third compressive stress layer extending from a surface of the article to a third depth of compression and having a third maximum compressive stress. The third water partial pressure may be greater than or equal to 0.05 MPa or greater than or equal to 0.075 MPa. The values of any of the properties of the third environment and third glass-based article may be selected from those disclosed for the corresponding properties in connection with the elevated pressure method.

In some embodiments, the first glass-based article may be cooled to ambient temperature or otherwise removed from the first environment after the conclusion of the first time period and prior to being exposed to the second environment. In some embodiments, the first glass-based article may remain in the first environment after the conclusion of the first time period, and the first environment conditions may be changed to the second environment conditions without cooling to ambient temperature or removing the first glass-based article from the water vapor containing environment.

The methods of producing the glass-based articles disclosed herein may be free of an ion exchange treatment with an alkali ion source. In embodiments, the glass-based articles are produced by methods that do not include an ion exchange with an alkali ion source. Stated differently, in some embodiments the glass-based substrates and glass-based articles are not subjected to an ion exchange treatment with an alkali ion source.

The exposure conditions may be modified to reduce the time necessary to produce the desired amount of hydrogen-containing species diffusion into the glass-based substrate. For example, the temperature and/or relative humidity may be increased to reduce the time required to achieve the desired degree of hydrogen-containing species diffusion and depth of layer into the glass-based substrate.

The methods and glass-based substrate compositions disclosed herein may produce glass-based articles that have a substantially haze-free or haze-free appearance.

Exemplary Embodiments

Glass compositions that are particularly suited for formation of the glass-based articles described herein were formed into glass-based substrates, and the glass compositions are provided in Table I below. The density of the glass compositions was determined using the buoyancy method of ASTM C693-93(2013). The strain point and anneal point were determined using the beam bending viscosity method of ASTM C598-93(2013). The softening point was determined using the parallel plate viscosity method of ASTM C1351M-96(2012). The Young's modulus and Poisson's ratio values refer to values as measured by a resonant ultrasonic spectroscopy technique of the general type set forth in ASTM E2001-13, titled "Standard Guide for Resonant Ultrasound Spectroscopy for Defect Detection in Both Metallic and Non-metallic Parts." The stress optical coefficient (SOC) was measured according to Procedure C (Glass Disc Method) described in ASTM standard C770-16, entitled "Standard Test Method for Measurement of Glass Stress-Optical Coefficient." The refractive index was measured at a wavelength of 589.3 nm. The liquidus temperature was measured in accordance with ASTM C829-81 (2015), titled "Standard Practice for Measurement of Liquidus Temperature of Glass by the Gradient Furnace Method." The liquidus viscosity was determined by measuring the viscosity of the glass at the liquidus temperature in accordance with ASTM C965-96(2012), titled "Standard Practice for Measuring Viscosity of Glass Above the Softening Point."

TABLE I

| | Composition | | | | | | | |
|---|---|---|---|---|---|---|---|---|
| | A | B | C | D | E | F | G | H |
| $SiO_2$ | 61.72 | 61.66 | 61.87 | 61.53 | 61.76 | 61.82 | 61.40 | 61.31 |
| $Al_2O_3$ | 11.10 | 11.09 | 11.14 | 11.11 | 11.16 | 11.16 | 13.08 | 14.09 |
| $P_2O_5$ | 9.69 | 9.69 | 9.55 | 9.66 | 9.53 | 9.53 | 7.69 | 6.72 |
| $Li_2O$ | 1.02 | 2.05 | 2.96 | 4.18 | 4.98 | 5.92 | 3.04 | 3.08 |
| $Na_2O$ | 0.13 | 0.13 | 0.12 | 0.11 | 0.10 | 0.10 | 0.14 | 0.14 |
| $K_2O$ | 16.33 | 15.39 | 14.37 | 13.35 | 12.41 | 11.41 | 14.65 | 14.66 |
| $SnO_2$ | 0.00 | 0.00 | 0.00 | 0.06 | 0.05 | 0.06 | 0.00 | 0.00 |
| | Properties | | | | | | | |
| Density (g/cm³) | 2.372 | 2.369 | 2.366 | 2.362 | 2.359 | 2.353 | 2.379 | 2.387 |
| Strain Pt. (° C.) | 526.0 | 548.0 | 587.0 | 608.0 | 621.0 | 628.0 | 572.4 | 578.4 |
| Anneal Pt. (° C.) | 588.0 | 612.0 | 650.0 | 668.0 | 684.0 | 692.0 | 635.2 | 641.5 |
| Softening Pt. (° C.) | 873.0 | 866.0 | 872.0 | 898.0 | 925.0 | | | |

TABLE I-continued

| | Composition | | | | | | | |
|---|---|---|---|---|---|---|---|---|
| | A | B | C | D | E | F | G | H |
| SOC (nm/mm/MPa) | 2.928 | 2.921 | 2.942 | 2.975 | 3.013 | 2.965 | 2.902 | 2.880 |
| Refractive Index at 589.3 nm | 1.4815 | 1.4825 | 1.4832 | 1.4834 | 1.4839 | 1.4841 | 1.4900 | 1.4900 |
| Young's Modulus (GPa) | 52.33 | 54.26 | 55.78 | 57.23 | 58.05 | 59.36 | 57.85 | 59.71 |
| Poisson's Ratio | | 0.2220 | 0.2180 | 0.2200 | 0.2270 | 0.2240 | 0.2187 | |
| 200 P Temperature (° C.) | 1714 | 1694 | 1691 | 1679 | 1671 | 1647 | | |
| 35 kP Temperature (° C.) | 1222 | 1213 | 1208 | 1194 | 1189 | 1173 | | |
| 200 kP Temperature (° C.) | 1112 | 1104 | 1101 | 1088 | 1088 | 1076 | | |
| Liquidus Temperature (° C.) | <800 | <830 | 1065 | 940 | 945 | 1065 | 1185 | 1275 |
| Liquidus Viscosity (kP) | >296851 | >90907 | 393 | 4321 | 4929 | 251 | | |

Samples having the compositions shown in Table I were exposed to water vapor containing environments to form glass articles having compressive stress layers. The sample composition and the environment the samples were exposed to, including the temperature, pressure, and exposure time, are shown in Table II below. The exposure environments were saturated where possible based on the temperature and pressure conditions. The resulting maximum compressive stress and depth of compression as measured by surface stress meter (FSM) is also reported in Table II.

TABLE II

| Example | 1 | 2 | 3 | 4 | 5 | 6 | 7 | 8 |
|---|---|---|---|---|---|---|---|---|
| Composition | A | A | A | A | B | B | B | B |
| Treatment Temperature (° C.) | 175 | 175 | 175 | 175 | 175 | 175 | 175 | 175 |
| Treatment Pressure (MPa) | 1 | 1 | 1 | 1 | 1 | 1 | 1 | 1 |
| Treatment Time (h) | 2 | 4 | 16 | 32 | 2 | 4 | 16 | 32 |
| Compressive Stress (MPa) | 314 | 248 | 110 | * | 326 | 268 | 238 | 209 |
| Depth of Compression (μm) | 14 | 21 | 32 | * | 10 | 15 | 22 | 27 |
| Appearance | Clear | Clear | Clear | Light Haze | Clear | Clear | Clear | Clear |
| Weight Gain (%) | 0.05% | 0.11% | 0.20% | 0.46% | 0.03% | 0.05% | 0.06% | 0.12% |

| Example | 9 | 10 | 11 | 12 | 13 | 14 | 15 | 16 |
|---|---|---|---|---|---|---|---|---|
| Composition | B | C | C | C | C | C | D | D |
| Treatment Temperature (° C.) | 175 | 175 | 175 | 175 | 175 | 175 | 175 | 175 |
| Treatment Pressure (MPa) | 1 | 1 | 1 | 1 | 1 | 1 | 1 | 1 |
| Treatment Time (h) | 72 | 2 | 4 | 16 | 32 | 72 | 4 | 16 |
| Compressive Stress (MPa) | 146 | 443 | 365 | 226 | 317 | 253 | 357 | 308 |
| Depth of Compression (μm) | 46 | 9 | 12 | 23 | 20 | 31 | 11 | 16 |
| Appearance | Clear | Clear | Clear | Clear | Clear | Clear | Clear | Clear |
| Weight Gain (%) | 0.25% | 0.02% | 0.03% | 0.07% | 0.06% | 0.11% | 0.03% | 0.04% |

| Example | 17 | 18 | 19 | 20 | 21 | 22 | 23 | 24 |
|---|---|---|---|---|---|---|---|---|
| Composition | D | E | E | E | F | F | F | G |
| Treatment Temperature (° C.) | 175 | 175 | 176 | 175 | 175 | 175 | 175 | 175 |
| Treatment Pressure (MPa) | 1 | 1 | 1 | 1 | 1 | 1 | 1 | 1 |

TABLE II-continued

| | | | | | | | | |
|---|---|---|---|---|---|---|---|---|
| Treatment Time (h) | 72 | 4 | 16 | 72 | 4 | 16 | 72 | 16 |
| Compressive Stress (MPa) | 273 | 347 | 343 | 283 | 351 | 348 | 327 | 333 |
| Depth of Compression (μm) | 28 | 10 | 14 | 25 | 9 | 13 | 22 | 16 |
| Appearance | Clear | Clear | Clear | Clear | Clear | Clear | Clear | Clear |
| Weight Gain (%) | 0.08% | 0.02% | 0.03% | 0.07% | 0.02% | 0.03% | 0.06% | 0.03% |

| Example | 25 | 26 | 27 | 28 | 29 | 30 | 31 | 32 |
|---|---|---|---|---|---|---|---|---|
| Composition | H | A | B | C | D | E | F | G |
| Treatment Temperature (° C.) | 175 | 200 | 200 | 200 | 200 | 200 | 200 | 200 |
| Treatment Pressure (MPa) | 1 | 1.6 | 1.6 | 1.6 | 1.6 | 1.6 | 1.6 | 1.6 |
| Treatment Time (h) | 16 | 4 | 4 | 4 | 16 | 16 | 16 | 4 |
| Compressive Stress (MPa) | 349 | * | 168 | 313 | 282 | 310 | 314 | 344 |
| Depth of Compression (μm) | 14 | * | 27 | 15 | 24 | 20 | 19 | 13 |
| Appearance | Clear | Haze | Very Light Haze | Clear | Clear | Clear | Clear | Clear |
| Weight Gain (%) | 0.03% | 0.47% | 0.14% | 0.05% | 0.07% | 0.06% | 0.05% | 0.03% |

| Example | 33 | 34 | 35 | 36 | 37 | 38 | 39 | 40 |
|---|---|---|---|---|---|---|---|---|
| Composition | G | H | A | B | C | D | E | F |
| Treatment Temperature (° C.) | 200 | 200 | 250 | 250 | 250 | 250 | 250 | 250 |
| Treatment Pressure (MPa) | 1.6 | 1.6 | 0.6 | 0.6 | 0.6 | 0.6 | 0.6 | 0.6 |
| Treatment Time (h) | 16 | 16 | 32 | 32 | 32 | 32 | 32 | 32 |
| Compressive Stress (MPa) | 339 | 351 | 230 | 265 | 230 | 197 | 220 | 232 |
| Depth of Compression (μm) | 23 | 21 | 59 | 48 | 45 | 43 | 40 | 37 |
| Appearance | Clear | Clear | Clear | Clear | Clear | Clear | Clear | Clear |
| Weight Gain (%) | 0.05% | 0.04% | 0.21% | 0.11% | 0.09% | 0.07% | 0.06% | 0.06% |

| Example | 41 | 42 | 43 | 44 | 45 | 46 | 47 | 48 |
|---|---|---|---|---|---|---|---|---|
| Composition | G | H | D | D | E | E | F | G |
| Treatment Temperature (° C.) | 250 | 250 | 300 | 300 | 300 | 300 | 300 | 300 |
| Treatment Pressure (MPa) | 0.6 | 0.6 | 2.6 | 2.6 | 2.6 | 2.6 | 2.6 | 2.6 |
| Treatment Time (h) | 32 | 32 | 24 | 96 | 24 | 96 | 96 | 24 |
| Compressive Stress (MPa) | 255 | 267 | 98 | 69 | 113 | 85 | 100 | 103 |
| Depth of Compression (μm) | 42 | 40 | 80 | 121 | 72 | 114 | 108 | 89 |
| Appearance | Clear | Clear | Clear | Clear | Clear | Clear | Clear | Clear |
| Weight Gain (%) | 0.07% | 0.06% | 0.26% | 0.51% | 0.22% | 0.46% | 0.44% | 0.25% |

| Example | 49 | 50 | 51 | 52 | 53 | 54 | 55 | 56 |
|---|---|---|---|---|---|---|---|---|
| Composition | G | H | H | A | A | B | B | C |
| Treatment Temperature (° C.) | 300 | 300 | 300 | 150 | 150 | 150 | 150 | 150 |
| Treatment Pressure (MPa) | 2.6 | 2.6 | 2.6 | 0.5 | 0.5 | 0.5 | 0.5 | 0.5 |
| Treatment Time (h) | 96 | 24 | 96 | 4 | 16 | 4 | 16 | 4 |

TABLE II-continued

| | | | | | | | | |
|---|---|---|---|---|---|---|---|---|
| Compressive Stress (MPa) | 98 | 90 | 129 | 382 | 280 | 427 | 303 | 378 |
| Depth of Compression (μm) | * | 88 | 140 | 10 | 18 | 7 | 14 | 8 |
| Appearance | Clear | Clear | Clear | Clear | Clear | Clear | Clear | Clear |
| Weight Gain (%) | 0.59% | 0.25% | 0.36% | 0.03% | 0.05% | 0.01% | 0.04% | |

| Example | 57 | 58 | 59 | 60 | 61 | 62 | 63 | 64 |
|---|---|---|---|---|---|---|---|---|
| Composition | C | D | D | E | E | F | F | G |
| Treatment Temperature (° C.) | 150 | 150 | 150 | 150 | 150 | 150 | 150 | 150 |
| Treatment Pressure (MPa) | 0.5 | 0.5 | 0.5 | 0.5 | 0.5 | 0.5 | 0.5 | 0.5 |
| Treatment Time (h) | 16 | 4 | 16 | 4 | 16 | 4 | 16 | 4 |
| Compressive Stress (MPa) | 315 | 334 | 395 | 313 | 328 | 368 | 316 | 350 |
| Depth of Compression (μm) | 14 | 6 | 10 | 5 | 10 | 5 | 9 | 6 |
| Appearance | Clear | Clear | Clear | Clear | Clear | Clear | Clear | Clear |
| Weight Gain (%) | 0.04% | 0.02% | 0.03% | 0.03% | 0.02% | 0.01% | 0.02% | 0.01% |

| Example | 65 | 66 | 67 | 68 | 69 | 70 | 71 | 72 |
|---|---|---|---|---|---|---|---|---|
| Composition | G | G | H | H | H | A | A | A |
| Treatment Temperature (° C.) | 150 | 150 | 150 | 150 | 150 | 175 | 175 | 175 |
| Treatment Pressure (MPa) | 0.5 | 0.5 | 0.5 | 0.5 | 0.5 | 0.76 | 0.76 | 0.76 |
| Treatment Time (h) | 16 | 32 | 4 | 16 | 32 | 2 | 4 | 6 |
| Compressive Stress (MPa) | 375 | 351 | 337 | 378 | 353 | 339 | 290 | * |
| Depth of Compression (μm) | 10 | 12 | 5 | 8 | 10 | 11 | 13 | * |
| Appearance | Clear | Clear | Clear | Clear | Clear | Clear | Clear | Clear |
| Weight Gain (%) | 0.01% | 0.02% | 0.00% | 0.01% | 0.02% | 0.04% | 0.05% | 0.07% |

| Example | 73 | 74 | 75 | 76 | 77 | 78 | 79 | 80 |
|---|---|---|---|---|---|---|---|---|
| Composition | A | A | B | B | C | C | C | C |
| Treatment Temperature (° C.) | 175 | 175 | 175 | 175 | 175 | 175 | 175 | 175 |
| Treatment Pressure (MPa) | 0.76 | 0.76 | 0.76 | 0.76 | 0.76 | 0.76 | 0.76 | 0.76 |
| Treatment Time (h) | 16 | 32 | 2 | 4 | 2 | 4 | 6 | 16 |
| Compressive Stress (MPa) | * | * | * | 352 | * | 413 | 391 | 362 |
| Depth of Compression (μm) | * | * | * | 9 | * | 8 | 10 | 14 |
| Appearance | Light Haze | Light Haze | Clear | Clear | Clear | Clear | Clear | Clear |
| Weight Gain (%) | 0.17% | 0.36% | 0.02% | 0.04% | 0.02% | 0.02% | 0.03% | 0.04% |

| Example | 81 | 82 | 83 | 84 | 85 | 86 | 87 | 88 |
|---|---|---|---|---|---|---|---|---|
| Composition | C | D | E | F | C | G | H | D |
| Treatment Temperature (° C.) | 175 | 175 | 175 | 175 | 225 | 225 | 225 | 250 |
| Treatment Pressure (MPa) | 0.76 | 0.76 | 0.76 | 0.76 | 2.6 | 2.6 | 2.6 | 4 |
| Treatment Time (h) | 32 | 240 | 240 | 240 | 4 | 16 | 16 | 1 |
| Compressive Stress (MPa) | 337 | 260 | 313 | 340 | * | 288 | 332 | 236 |

TABLE II-continued

| Depth of Compression (μm) | 18 | 39 | 33 | 31 | * | 35 | 21 | 20 |
|---|---|---|---|---|---|---|---|---|
| Appearance | Clear | Clear | Clear | Clear | Clear | Clear | Clear | Clear |
| Weight Gain (%) | 0.06% | 0.03% | 0.01% | | 0.17% | 0.09% | 0.07% | 0.07% |

| Example | 89 | 90 | 91 | 92 | 93 | 94 | 95 | 96 |
|---|---|---|---|---|---|---|---|---|
| Composition | D | E | E | F | F | F | G | H |
| Treatment Temperature (° C.) | 250 | 250 | 250 | 250 | 250 | 250 | 250 | 250 |
| Treatment Pressure (MPa) | 4 | 4 | 4 | 4 | 4 | 4 | 4 | 4 |
| Treatment Time (h) | 4 | 1 | 4 | 1 | 4 | 16 | 4 | 4 |
| Compressive Stress (MPa) | 191 | 262 | 194 | 280 | 221 | * | * | 310 |
| Depth of Compression (μm) | | 17 | 28 | 15 | 24 | * | * | 27 |
| Appearance | Clear | Clear | Clear | Clear | Clear | Haze | Clear | Clear |
| Weight Gain (%) | 0.16% | 0.06% | 0.10% | 0.05% | 0.08% | 0.73% | 0.20% | 0.07% |

While typical embodiments have been set forth for the purpose of illustration, the foregoing description should not be deemed to be a limitation on the scope of the disclosure or appended claims. Accordingly, various modifications, adaptations, and alternatives may occur to one skilled in the art without departing from the spirit and scope of the present disclosure or appended claims.

What is claimed is:

1. A method, comprising:
   exposing a glass-based substrate to a saturated water vapor environment with a temperature of greater than or equal to 85° C. to form a glass-based article with compressive stress layer extending from the surface of the glass-based article to a depth of compression and a hydrogen-containing layer extending from the surface of the glass-based article to a depth of layer,
   wherein the compressive stress layer comprises a compressive stress of greater than or equal to 10 MPa, a hydrogen concentration of the hydrogen-containing layer decreases from a maximum hydrogen concentration to the depth of layer, and the glass-based substrate comprises:
   greater than or equal to 55 mol % to less than or equal to 70 mol % $SiO_2$,
   greater than or equal to 3 mol % to less than or equal to 17 mol % $Al_2O_3$,
   greater than or equal to 3 mol % to less than or equal to 15 mol % $P_2O_5$,
   greater than or equal to 1 mol % to less than or equal to 7 mol % $Li_2O$, and
   greater than or equal to 5 mol % to less than or equal to 20 mol % $K_2O$.

2. The method of claim 1, wherein the glass-based substrate comprises greater than or equal to 0 mol % to less than or equal to 1 mol % $Na_2O$.

3. The method of claim 1, wherein the glass-based substrate comprises greater than or equal to 0 mol % to less than or equal to 0.5 mol % $SnO_2$.

4. The method of claim 1, wherein the compressive stress layer comprises a compressive stress of greater than or equal to 50 MPa.

5. The method of claim 1, wherein the compressive stress layer comprises a compressive stress of greater than or equal to 300 MPa.

6. The method of claim 1, wherein the depth of compression is greater than or equal to 5 μm.

7. The method of claim 1, wherein the depth of compression is greater than or equal to 100 μm.

8. The method of claim 1, wherein the glass-based article is not subjected to an ion-exchange treatment with an alkali ion source.

9. The method of claim 1, wherein the glass-based article has a substantially haze-free appearance.

* * * * *

UNITED STATES PATENT AND TRADEMARK OFFICE
CERTIFICATE OF CORRECTION

Page 1 of 1

PATENT NO. : 11,505,492 B2
APPLICATION NO. : 17/734175
DATED : November 22, 2022
INVENTOR(S) : Timothy Michael Gross et al.

It is certified that error appears in the above-identified patent and that said Letters Patent is hereby corrected as shown below:

On the Title Page

On the page 3, in item (56), in Column 1, under "Other Publications", Line 7, delete "Writien" and insert -- Written --.

On the page 3, in item (56), in Column 2, under "Other Publications", Line 6, delete "Si02-Ca0-Al203-K20-P2O5" and insert -- SiO2-CaO-Al2O3-K2O-P2O5 --.

On the page 3, in item (56), in Column 2, under "Other Publications", Line 7, delete "Phsyics" and insert -- Physics --.

On the page 3, in item (56), in Column 2, under "Other Publications", Line 12, delete "Infared" and insert -- Infrared --.

On the page 3, in item (56), in Column 2, under "Other Publications", Line 18, delete "Na20-Si02" and insert -- Na2O-SiO2 --.

On the page 3, in item (56), in Column 2, under "Other Publications", Line 22, delete "Dages C-156-Cl57." and insert -- Pages C-156-C157. --.

Signed and Sealed this
Twenty-fifth Day of July, 2023

Katherine Kelly Vidal
*Director of the United States Patent and Trademark Office*